(12) United States Patent
Altshuler et al.

(10) Patent No.: US 10,678,044 B2
(45) Date of Patent: Jun. 9, 2020

(54) BEAM-STEERING DEVICES EMPLOYING ELECTROWETTING PRISMS

(71) Applicant: Canon U.S.A., Inc., Melville, NY (US)

(72) Inventors: Alexander Altshuler, Cambridge, MA (US); Badr Elmaanaoui, Belmont, MA (US)

(73) Assignee: Canon U.S.A., Inc., Melville, NY (US)

( * ) Notice: Subject to any disclaimer, the term of this patent is extended or adjusted under 35 U.S.C. 154(b) by 117 days.

(21) Appl. No.: 15/684,287

(22) Filed: Aug. 23, 2017

(65) Prior Publication Data
US 2019/0064502 A1 Feb. 28, 2019

(51) Int. Cl.
| | |
|---|---|
| *G02B 26/00* | (2006.01) |
| *G02B 26/08* | (2006.01) |
| *G02F 1/29* | (2006.01) |
| *G02B 23/24* | (2006.01) |
| *G02B 26/10* | (2006.01) |
| *G01B 9/02* | (2006.01) |

(52) U.S. Cl.
CPC ....... *G02B 26/005* (2013.01); *G01B 9/02015* (2013.01); *G01B 9/02091* (2013.01); *G02B 23/2469* (2013.01); *G02B 26/10* (2013.01); *G01B 9/0209* (2013.01); *G01B 2290/65* (2013.01)

(58) Field of Classification Search
CPC ............ G02B 23/2469; G02B 23/2415; G02B 23/2423; G02B 23/2484; G02B 23/26; G02B 26/005; G02B 5/18
USPC ........ 359/237, 242, 265–267, 290–292, 295, 359/298
See application file for complete search history.

(56) References Cited

U.S. PATENT DOCUMENTS

| | | |
|---|---|---|
| 7,366,376 B2 | 4/2008 | Shishkov et al. |
| 7,843,572 B2 | 11/2010 | Tearney et al. |
| (Continued) | | |

FOREIGN PATENT DOCUMENTS

| | | |
|---|---|---|
| WO | 2015/116939 A1 | 6/2015 |
| WO | 2015/112770 A1 | 7/2015 |
| (Continued) | | |

OTHER PUBLICATIONS

Yelin, D., et al, "Three-dimensional miniature endoscope", Nature, Oct. 19, 2006, pp. 765-vol. 443.
(Continued)

*Primary Examiner* — Brandi N Thomas
(74) *Attorney, Agent, or Firm* — Canon U.S.A., Inc., IP Division

(57) ABSTRACT

A rotation-free beam-steering device for manipulating probing and reflected optical beams includes at least one electrowetting cell having at least one side wall defining an inner space. The at least one side wall has a lining adjacent to the inner space. A liquid at least partially fills the inner space. The liquid has at least one controlled surface not in contact with the wall lining. The liquid further has a contact angle with the wall lining. The at least one controlled surface is disposed to interface with an optical beam exiting from a distal end of an optical fiber at an incidence angle. At least two electrodes are provided separated from the inner space by the lining. An electrical potential on the at least two electrodes is controlled to adjust the contact angle of the liquid bounding the at least one controlled surface.

20 Claims, 20 Drawing Sheets

(56) References Cited

U.S. PATENT DOCUMENTS

| | | |
|---|---|---|
| 7,940,467 B2 | 5/2011 | Berge et al. |
| 8,180,134 B2 | 5/2012 | Wang |
| RE43,875 E | 12/2012 | Shishkov et al. |
| 8,649,102 B2 | 2/2014 | Berge et al. |
| RE45,142 E | 9/2014 | Kehrer et al. |
| 8,928,889 B2 | 1/2015 | Tearney et al. |
| 9,041,999 B2 | 5/2015 | Bae et al. |
| 9,042,027 B2 | 5/2015 | Egan et al. |
| 9,087,368 B2 | 7/2015 | Tearney et al. |
| 9,164,272 B2 | 10/2015 | Maillard et al. |
| 9,332,942 B2 | 5/2016 | Jaffer et al. |
| 9,335,548 B1 | 5/2016 | Cakmakci et al. |
| 9,513,276 B2 | 12/2016 | Tearney et al. |
| 9,557,154 B2 | 1/2017 | Tearney et al. |
| 2005/0165315 A1 | 7/2005 | Zuluaga et al. |
| 2007/0156021 A1 | 7/2007 | Morse et al. |
| 2007/0233396 A1 | 10/2007 | Tearney et al. |
| 2008/0013960 A1 | 1/2008 | Tearney et al. |
| 2010/0092389 A1 | 4/2010 | Jaffer |
| 2011/0292400 A1 | 12/2011 | Fleming et al. |
| 2012/0101374 A1 | 4/2012 | Tearney et al. |
| 2013/0128215 A1* | 5/2013 | Sakurai .................. G02B 6/35 349/196 |
| 2014/0168754 A1* | 6/2014 | Kim |
| 2014/0300711 A1 | 10/2014 | Kroon et al. |
| 2015/0378105 A1 | 12/2015 | Godbout et al. |
| 2016/0065955 A1* | 3/2016 | Kim .................. G03H 1/0005 348/54 |
| 2017/0135584 A1 | 5/2017 | Tearney et al. |
| 2017/0209049 A1 | 7/2017 | Wang et al. |
| 2018/0017778 A1 | 1/2018 | Ikuta et al. |
| 2018/0364154 A1* | 12/2018 | Wu .......................... A61B 1/00 |

FOREIGN PATENT DOCUMENTS

| | | |
|---|---|---|
| WO | 2015/144880 A1 | 10/2015 |
| WO | 2016/077252 A1 | 5/2016 |

OTHER PUBLICATIONS

Pawlowski, M.E., et al, "Miniature, minimally invasive, tunable endoscope for investigation of the middle ear", Biomedical Optics Express, Jun. 1, 2015, pp. 2246-2257, vol. 6, No. 6.

Smith, N. R., et al, "Agile wide-angle beam steering with electrowetting microprisms", Optics Express, Jul. 10, 2006, pp. 6557-6563, vol. 14, No. 14.

Terrab, S., et al, "Adaptive electrowetting lens-prism element", Optics Express, Oct. 5, 2015, pp. 25838-25845, vol. 23, No. 20.

Wang, T., et al, "Development of a high-speed synchronous micro motor and its application in intravascular imaging", Sensors and Actuators A 218, 2014, pp. 60-68.

Clement, C. E., et al, "High-performance beam steering using electrowetting-driven liquid prism fabricated by a simple dip-coating method", Appl. Phys. Lett. 2016, vol. 108, abstract only.

Beaudette, K. et al., "Towards in vivo laser coagulation and concurrent optical coherence tomography through double-clad fiber devices", Proc. SPIE, Multimodal Biomedical Imaging XI, Mar. 7, 2016, vol. 9701 (English abstract).

* cited by examiner

BEAM-STEERING DEVICES EMPLOYING ELECTROWETTING PRISMS

FIELD OF THE DISCLOSURE

The subject disclosure generally relates to electrowetting beam-steering devices, and in particular, miniature and micro-miniature endoscopes which operate without rotation of parts by utilizing beam-steering devices employing electrowetting prisms. Furthermore, the disclosure relates to example apparatus, systems, and methods for the fabrication and use of miniature and micro-miniature endoscopes that employ electrowetting prisms.

BACKGROUND INFORMATION

Endoscopes are used for a variety of medical diagnostic and therapeutic indications. There are numerous endoscopes specifically designed for the examination of body parts including the esophagus, stomach and duodenum, colon, blood vessels, bronchi, the peritoneal cavity, joint spaces, etc. Such medical devices/probes have the ability to provide images from inside the patient's body. Considering the potential damage to a human body caused by the insertion of a foreign object, it is preferable for the probe to be as small as possible for many applications. Additionally, the ability to image within small pathways such as small vessels, small ducts, small needles, cracks etc., requires a small probe size.

When the endoscope needs to be small, either to reach small or difficult to reach parts of the body or to reduce trauma, the difficulty and ability to make and use endoscopes becomes much more challenging. For example, it is difficult to form an effective imaging window while maintaining ultra-thin window and side-wall thicknesses. Similarly, the endoscope and method of making the same and fitting in the various components with the necessary clearances into a small outer profile is technically challenging. Thus, there is a need for new miniature and micro-miniature endoscopes with enhanced performance and methods of making such endoscopes in a cost effective manner.

There have been numerous known approaches to reducing the size of endoscopes (i.e., achieving further miniaturization) for various specific imaging techniques such as optical coherence tomography (hereinafter referred to as "OCT") and spectrally encoded endoscopy ("SEE") or the like over the years.

In order to obtain an optical image of a surface using OCT or SEE, the surface of the subject study area has to be scanned with an optical beam. Currently, the most common method for scanning is to "rotate" a signal transmitting optical fiber with some turning/focusing optics located on its distal end.

An example of the "rotating" approach is disclosed in International PCT Publication WO 2016/077252 to Leo D. Didomenico, entitled "Wide-angle, broadband, polarization independent beam steering and concentration of wave energy utilizing electronically controlled soft matter", published May 19, 2016, (hereinafter referred to as "DIDOMENICO") which provides a general method for electronically reconfiguring the internal structure of a solid to allow precision control of the propagation of wave energy. The method allows digital or analog control of wave energy, such as but not limited to visible light, while maintaining low losses, a multi-octave bandwidth, polarization independence, large area and large dynamic range in power handling. Embodiments of such technique are provided for large-angle beam steering, lenses and other devices to control wave energy.

A downside to the "rotating" approach, however, is that it requires quite elaborate mechanics to rotate the fiber and a complicated optical alignment on the proximal end of the fiber, while suffering from image irregularities caused by non-uniform rotational distortions (NURD). Moreover, other devices utilize optical rotary junctions which suffer from the same technical drawbacks.

Another method of scanning using an optical beam is to obtain an optical image of a surface using OCT or SEE using "micro-miniature motors" is to rotate a scanning optical component (e.g. mirror) in front of the distal end of a stationary optical fiber.

An example of the "micro-miniature motor" approach is disclosed in publication entitled "Development of a high-speed synchronous micro motor and its application in intravascular imaging" to Wang et al., Sensor and Actuators A 218 (2014) 60-68, (hereinafter referred to as "WANG et al".) which discloses the design, fabrication and characterization of a synchronous micro motor which consists of flex print coils and a permanent magnet rotor. The size of the motor is 2.0 mm length and 1.0 mm outer diameter. With 1.0 A effective driving current, the motor can rotate a 0.3 mm mirror at a maximum speed of 3640 revolutions per second. An application of the micro motor may be used as a distal actuator for intravascular imaging.

A second example of the "micro-miniature motors" approach to rotate a scanning optical component (e.g. mirror) in front of the distal end of a stationary optical fiber is disclosed in U.S. Pat. No. 9,513,276 to Tearney et al., entitled "Method and Apparatus for Optical Imaging via Spectral Encoding", published on Feb. 19, 2015, (hereinafter referred to as "TEARNEY et al.") which describes a method and apparatus for endoscopic confocal microscopy which circumvents the need for miniature, high-speed scanning mechanisms with a probe. Spectrally encoded confocal microscopy ("SECM") is a wavelength-division multiplexed confocal approach that may be used which utilizes a broad bandwidth light source and can encode one dimension of spatial information in the optical spectrum.

While the aforementioned approaches disclosed in both WANGA et al. and TEARNEY et al. simplifies the design of the endoscopic instrument, motors of such a small size are quite difficult and expensive to manufacture. In addition, electric motors tend to generate heat while rotating and needs measures to dissipate heat produced by this motor.

In lieu of the "rotating" optical fiber approach requiring elaborate mechanics (such as rotating optical-junctures) to rotate the fiber and having a complicated optical alignment on the proximal end of the fiber, while suffering from irregularities caused by NURD (see above DIDOMENICO); and in lieu of the "micro-miniature motor" on a distal end of an instrument approach (see above WANGA et al. and TEARNEY et al), scientists, researchers and inventors have looked towards electrowetting-based optical devices to provide an advantageous, versatile, and cost effective alternatives to the previous methods discussed above.

Electrowetting devices, and in particular electrowetting lenses and prisms, are known in the art, and generally comprise a refractory interface between first and second immiscible liquids that is moveable by electrowetting. Such devices have a number of attractive features including transmissive geometry, small size, low operating voltages, fast response time, low insertion losses, polarization insensitivity, large stroke and good optical quality. These favorable properties make utilizing electrowetting lenses a more versatile solution than technologies such as spatial light modulators, micro-electro-mechanical segmented (MEMS) and deformable mirror systems, piezo-actuated deformable mirrors, and flexible membrane liquid lenses. (excerpt from WO 2015/112770 to Gopinath et al below).

An example of utilizing electrowetting optics technology in endoscopes is disclosed in International PCT Publication WO 2015/112770 A1 to Gopinath et al., entitled "Optical imaging devices and variable-focus elements, and methods for using them", published Jul. 20, 2015, (hereinafter referred to as GOPINATH et al.) which relates to optical imaging devices and methods useful in biological and medical imaging applications. In one embodiment, an optical imaging device includes a flexible lightguide. An output of a source of pulsed infrared radiation is optically coupled to a first end of the flexible light guide. A lens assembly is attached to and optically coupled to a second end of the flexible lightguide. A lens assembly includes a variable-focus lens element having a tunable focal length and a photodetector coupled to the flexible lightguide to detect radiation propagating from the second end toward the first end of the flexible light guide. Such above described optical imaging devices and methods can be used in both confocal and multi-photon techniques.

And still yet another example of utilizing electrowetting optics technology in endoscopes is disclosed in publication entitled "Miniature, minimally invasive, tunable endoscope for investigation of the middle ear" to Pawlowski et al, Biomed Opt Express 2015 Jun. 1; 6(6): 2246-2257 (hereinafter referred to as "PAWLOWSKI et al.") which discloses a miniature, tunable endoscopic probe for facilitating examination of the auditory system. The distal end of the rigid endoscope is designed to allow for safe insertion into the tympanic chamber through a small incision in the tympanic membrane (myringotomy). To achieve this goal, the distal end of the rigid endoscope is encapsulated into a hypodermic tube with an outer diameter of 1.4 mm. Tunability, provided by incorporation of the electrowetting lens, allows the operator to electronically move the object plane along the optical axis, providing imaging capability beyond the depth of field of a static optical system. Since movement of the plane of the best focus is facilitated by an electronically controlled change of curvature at the interface between two immiscible liquids within the tunable lens, the distal end of optical system can be held stationary at a safe distance away from the auditory apparatus. The miniature tunable endoscope is further capable of sharp imaging of anatomical features of parts of the ossicular chain, providing objective and quantitative morphological data.

However, while it is noted that while U.S. Patent Publication No. 2007/0156021, PCT Publication WO 2015/112770 A1 and PAWLOWSKI et al. address adaptive electrowetting features utilized for focusing, tuning focal length and zooming function in endoscopes, there has yet to be developed and/or proposed miniature endoscopes which utilize electrowetting features for obtaining an optical image of a surface using OCT or SEE techniques to scan the surface of a subject study area with an optical beam which (1) has a simplified design that does not use rotating mechanical components (as an alternative to optical rotary junction and micro-miniature motors), (2) has low non-uniform rotational distortions (NURD), and (3) allows for dimensional scaling down to molecular level.

Accordingly, with regard to investigation of internal organs with ultrahigh resolution, OCT and SEE miniaturized endoscopic probes that can be positioned in the vicinity of the respective biological surfaces are needed so that minimally invasive cross-sectional images in vivo, can be effectively used to assess the health of patients in a safe, effective, economical and painless manner which meet the such requirements.

Hence, it would be advantageous to have a scanning element at a distal end of an imaging fiber of a medical instrument, such as a miniature endoscope or a micro-miniature endoscope, that does not have any moving parts and is small enough to be compatible with the size of the optical fiber which (1) has a simplified design that does not use rotating mechanical components (as an alternative to optical rotary junction and micro-miniature motors), (2) has low non-uniform rotational distortions (NURD), and (3) allows for dimensional scaling down to molecular level.

In view of the these considerations, there is a need to address and/or overcome at least some of the deficiencies described herein above.

SUMMARY OF EXAMPLE EMBODIMENTS

Accordingly, it can be beneficial to address and/or overcome at least some of the deficiencies indicated herein above, and thus to provide rotation-free beam-steering devices employing electrowetting prisms for miniature and micro-miniature endoscopic.

According to various example embodiments of the present disclosure, apparatus, systems and methods for utilizing and manufacturing miniature and micro-miniature endoscopes which utilize electrowetting features for obtaining an optical image of a surface using OCT or SEE techniques to scan the surface of a subject study area with an optical beam which (1) has a simplified design that does not use rotating mechanical components (as an alternative to optical rotary junction and micro-miniature motors), (2) has low non-uniform rotational distortions (NURD), and (3) allows for dimensional scaling down to molecular level.

According to an embodiment of the present disclosure, a rotation-free beam-steering device for manipulating probing and reflected optical beams includes at least one electrowetting cell having at least one side wall defining an inner space. The at least one side wall has a lining adjacent to the inner space. A liquid at least partially fills the inner space. The liquid has at least one controlled surface not in contact with the wall lining. The liquid further has a contact angle with the wall lining. The at least one controlled surface is disposed to interface with an optical beam exiting from a distal end of an optical fiber at an incidence angle. At least two electrodes are provided separated from the inner space by the lining. An electrical potential on the at least two electrodes is controlled to adjust the contact angle of the liquid bounding the at least one controlled surface.

According to another embodiment of the present disclosure, the device further includes a beam focusing optical component positioned between the distal end of the optical fiber and the at least one electrowetting cell.

According to yet another embodiment of the present disclosure, the device, the beam focusing optical component is integrated together with an input aperture of the at least one electrowetting cell.

According to still another embodiment of the present disclosure, the device further includes an additional beam deflecting/shaping/modifying element disposed to interact with the probing optical beam exiting the at least one electrowetting cell.

According to another embodiment of the present disclosure, the device, the beam deflecting/shaping/modifying element includes one of an opening or transparent window about a center axis of the beam deflecting/shaping/modifying element to facilitate switching from a forward viewing mode to at least one of a side-viewing mode and back-viewing mode.

According to yet another embodiment of the present disclosure, the device includes an axisymmetric light dispersing element such as a diffraction grating disposed to interact with the probing optical beam exiting the at least one electrowetting cell, wherein the axisymmetric light dispersing element is arranged to create a rotating spectrally split beam for spectrally encoded endoscopy (SEE).

According to still another embodiment of the present disclosure, the device further includes a rectangular light dispersing element (e.g., a diffraction grating) disposed to interact with the probing optical beam exiting the at least one electrowetting cell, wherein the at least one electrowetting cell consists of one electrowetting prism, and wherein the rectangular light dispersing element is arranged so a beam deflection plane of the one electrowetting prism is orthogonal to a beam dispersion plain of the rectangular light dispersing element to obtain an image using spectrally encoded endoscopy (SEE).

According to another embodiment of the present disclosure, the at least one electrowetting cell consists of a single electrowetting cell having a substantially cylindrical wall with a plurality of electrodes circumferentially positioned around the cylindrical wall. In yet other embodiments, the plurality of electrodes are positioned along a longitudinal length of the cylindrical wall such that the plurality of electrodes are generally parallel to each and parallel to a center axis of the cylindrical wall, and wherein the plurality of electrodes are generally equally spaced apart between each other along the longitudinal length of the cylindrical wall. According to still another embodiment of the present disclosure, the at least one electrowetting cell consists of pair of electrowetting prisms stacked together contiguously adjacent each other such that the pair of electrowetting prisms are both disposed to interface with a probing beam and to deflect the probing beam in mutually orthogonal directions with respect to the pair of electrowetting prisms.

According to another embodiment of the present disclosure, a rotation-free optical beam-steering assembly is provided which includes a pair of electrowetting prisms stacked together contiguously adjacent each other such that the pair of electrowetting prisms are both disposed to interface with a probing beam and to deflect the probing beam in mutually orthogonal directions with respect to the pair of electrowetting prisms. Each of the electrowetting prisms includes at least one side wall defining an inner space, the at least one side wall having a wall lining adjacent to the inner space; a liquid at least partially filling the inner space, the liquid having at least one controlled surface not in contact with the wall lining, the liquid having a contact angle with the wall lining, the at least one controlled surface being disposed to interface with a probing optical beam exiting the distal end of an optical fiber at an incidence angle; and at least two electrodes separated from the inner space by the wall lining. Manipulating electrical potential on the at least two electrodes controls a contact angle of liquid bounding the at least one controlled surface, whereby the probing optical beam direction can be manipulated.

According to yet another embodiment of the present disclosure, a rotation-free optical beam-steering assembly is provided including a cylindrical electrowetting prism having a substantially cylindrical wall defining an inner space, the cylindrical wall having a wall lining adjacent to the inner space; a liquid at least partially filling the inner space, the liquid having at least one controlled surface not in contact with the wall lining, the liquid having a contact angle with the wall lining, the at least one controlled surface being disposed to interface with a probing optical beam exiting a distal end of an optical fiber at an incidence angle; and at least two electrodes separated from the inner space by the wall lining. Manipulating electrical potential on the at least two electrodes controls a contact angle of liquid bounding the at least one controlled surface, whereby the probing optical beam direction can be manipulated.

According to yet another embodiment of the present disclosure, an image acquisition system is provided, the system providing at least one optical fiber having a proximal end and a distal end; a light source and optical beam manipulation hardware, including at least one processor and at least one memory, adapted to manipulate probing and reflected optical beams adjacent and contiguous to the proximate end of the at least one optical fiber; and a rotation-free optical beam-steering assembly comprising: a pair of electrowetting prisms stacked together contiguously adjacent each other such that the pair of electrowetting prisms are both disposed to interface with a probing beam and to deflect the probing beam in mutually orthogonal directions with respect to the pair of electrowetting prisms, each electrowetting prism comprising: at least one side wall defining an inner space, the at least one side wall having a wall lining adjacent to the inner space; a liquid at least partially filling the inner space, the liquid having at least one controlled surface not in contact with the wall lining, the liquid having a contact angle with the wall lining, the at least one controlled surface being disposed to interface with a probing optical beam exiting the distal end of an optical fiber at an incidence angle; and at least two electrodes separated from the inner space by the wall lining, wherein manipulating electrical potential on the at least two electrodes controls a contact angle of liquid bounding the at least one controlled surface, whereby the probing optical beam direction can be manipulated.

According to yet another embodiment of the present disclosure, there is provided an image acquisition system comprising: at least one optical fiber having a proximal end and a distal end; a light source and optical beam manipulation hardware, including at least one processor and at least one memory, adapted to manipulate probing and reflected optical beams adjacent and contiguous to the proximate end of the at least one optical fiber; and a rotation-free optical beam-steering assembly comprising: a cylindrical electrowetting prism having a substantially cylindrical wall defining an inner space, the cylindrical wall having a wall lining adjacent to the inner space; a liquid at least partially filling the inner space, the liquid having at least one controlled surface not in contact with the wall lining, the liquid having a contact angle with the wall lining, the at least one controlled surface being disposed to interface with a probing optical beam exiting a distal end of an optical fiber at an incidence angle; and at least two electrodes separated from the inner space by the wall lining, the at least two electrodes circumferentially positioned around the cylindrical wall along a longitudinal length of the cylindrical wall such that the at least two electrodes are generally parallel to each other and parallel to a center axis of the cylindrical electrowetting prism, and generally equally spaced between each other along the longitudinal length of the cylindrical wall, wherein manipulating electrical potential on the at least two electrodes controls a contact angle of liquid bounding the at least one controlled surface, whereby the probing optical beam direction can be manipulated According to one embodiment of the present disclosure, a fiber optics based image acquisition system is provided including at least one optical fiber having a proximal end and a distal end with a light source and optical beam manipulation hardware adapted to manipulate probing and reflected optical beams adjacent to the proximal end of the optical fiber and having an electrowetting beam deflecting device positioned adjacent to the distal end of the optical fiber. In some embodiments, the reflected optical beams adjacent and contiguous to the proximal end of the optical fiber and having an electrowetting beam deflecting device positioned adjacent and contiguous to the distal end of the optical fiber. In other embodiments, a gap or spacer is present. The electrowetting beam deflecting device includes at least one electrowetting cell having at least one side wall defining an inner space, the at least one side wall having a lining adjacent to the inner space; a liquid at least partially filling the inner space, the liquid having at least one controlled surface not in contact with the wall lining, the liquid having a contact angle with the wall lining, the at least one controlled surface being disposed to interface with the probing optical beam exiting from the distal end of the optical fiber at an incidence angle; and at least two electrodes separated from the inner space by the lining. Manipulating electrical potential on the at least two electrodes controls the contact angle of the liquid bounding the at least one controlled surface, whereby the probing optical beam direction can be manipulated.

These and other aspects, features, and advantages of numerous example embodiments of the present disclosure will become apparent upon reading the following detailed description of the numerous example embodiments of the present disclosure, when taken in conjunction with the appended drawings, and provided claims.

BRIEF DESCRIPTION OF THE DRAWINGS

Further aspects, features and advantages of the present disclosure will become apparent from the following detailed description when taken in conjunction with the accompanying figures showing the illustrative numerous embodiments of the present disclosure in which.

Figure 1A:
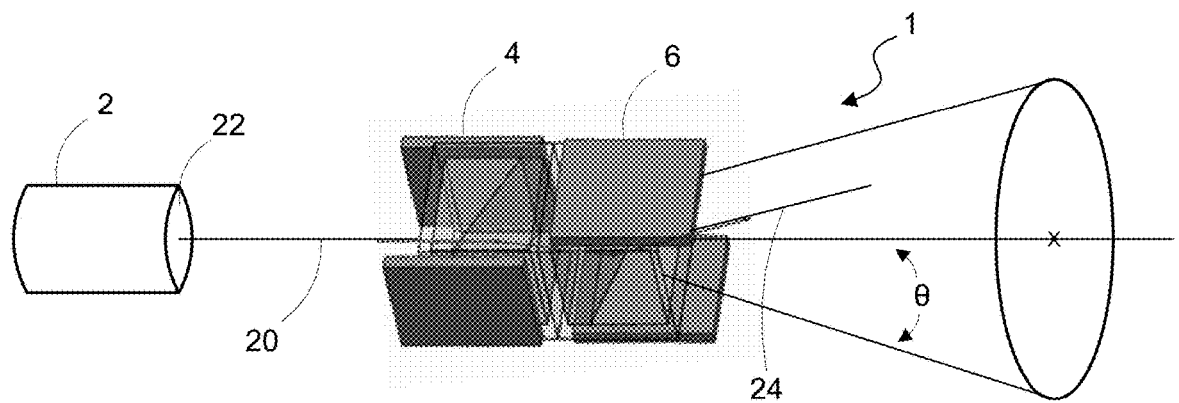
FIG. 1A is a perspective view of a beam-steering device/assembly 1 employing a double stacked electrowetting prism configuration, according to an example embodiment of the disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF THE DISCLOSURE

FIG. 1A is an illustration of a beam-steering device/assembly 1 employing a double-stacked electrowetting prism configuration, according to an example embodiment of the disclosure. The beam-steering device 1 is positioned at the distal end 22 of stationary optical fiber 2 inside a miniature or micro-miniature endoscope, for example. Such a beam-steering device 1 may be incorporated in a miniature or micro-miniature endoscope utilized in a fiber optics based image acquisition system including optical fiber 2 having a proximal end and a distal end 22 with a light source 130 (See FIGS. 13 and 14) and optical beam manipulation hardware (See FIGS. 13 and 14) adapted to manipulate probing and reflected optical beams adjacent to the proximal end of the optical fiber 2 and having a pair electrowetting beam deflecting cells or prisms 4, 6 positioned adjacent (in a double-stacked configuration) and contiguous to the distal end 22 of the optical fiber 2.

In the example embodiment of FIG. 1A, the beam-steering device/assembly 1 employing the double stacked electrowetting prism configuration, includes a pair of electrowetting cells 4, 6, such as electrowetting prisms (EWP) which are configured in a double-stacked configuration so that a beam entering side of electrowetting prism 6 is connected to a beam exiting side of electrowetting prism 4. Moreover, electrowetting prism 6 is clocked 90 degrees, for example, compared to the position of electrowetting prism 4. By combining two consecutive electrowetting microprisms 4, 6, an optical beam 20 may be deflected in two orthogonal directions. As a result, driving the optical beam with a sinusoidal voltage phase shifted at 90 degrees between both EWPs 4 and 6 will result in an output beam 24 scanning along a surface of a cone 24 having an angle of incidence of θ (a.k.a. optical beam deflection angle θ) from a centerline of the cone 24. If is further noted that in other alternative embodiments, EWP 6 may also be clocked at other amounts of degrees (besides 90 degrees) relative to EWP for varying effectivity.

Figure 1B:
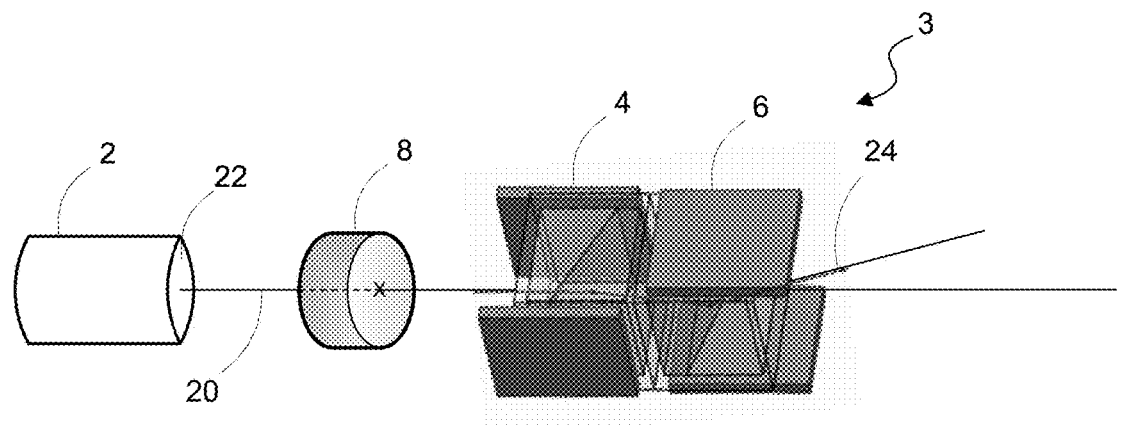
FIG. 1B is a perspective view of a beam-steering device/assembly 3 employing a double stacked electrowetting prism configuration including an additional beam focusing component 8, according to another example embodiment of the disclosure.

FIG. 1B is an illustration of a beam-steering device/assembly 3 employing a double stacked electrowetting prism configuration 4, 6 including an additional beam focusing component 8, according to another example embodiment of the disclosure. Here, the additional beam focusing optical component 8 (such as a lens) may be placed between the fiber end 22 and the first electrowetting prism 4 to act as an astigmatism correction feature or for other imaging purposes, for example.

Figure 1C:
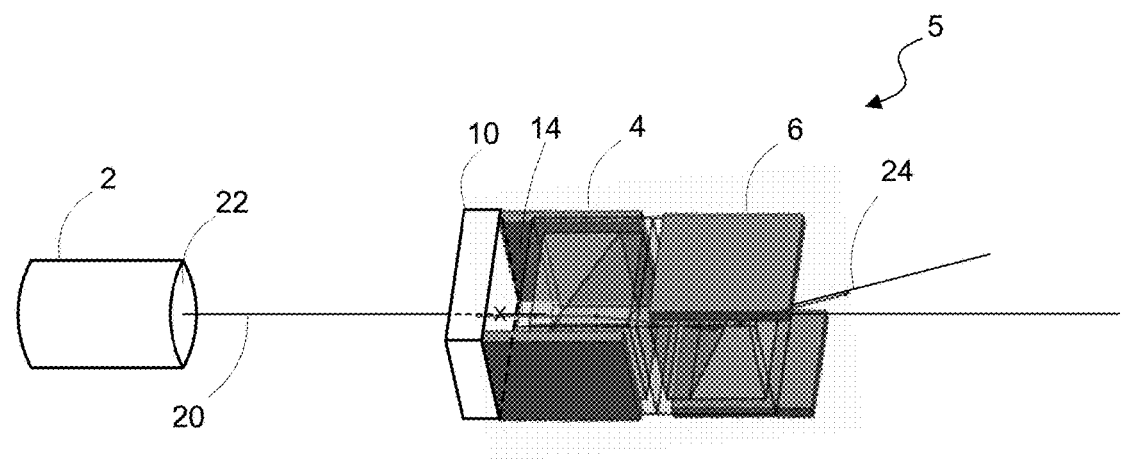
FIG. 1C is a perspective view of a beam-steering device/assembly 5 employing a double stacked electrowetting prism configuration including an additional beam focusing component 10 integrated as part of the first electrowetting prism 4, according to another example embodiment of the disclosure.

FIG. 1C is an illustration of a beam-steering device/assembly 5 employing a double stacked electrowetting prism configuration 4, 6 including an additional beam focusing component 10 integrated as part of the first electrowetting prism 4, according to another example embodiment of the disclosure. In particular, the additional beam focusing component 10 may be integrated as part of the first electrowetting prism's 4 input aperture 14 for size reduction purposes, for example.

Figure 2A:
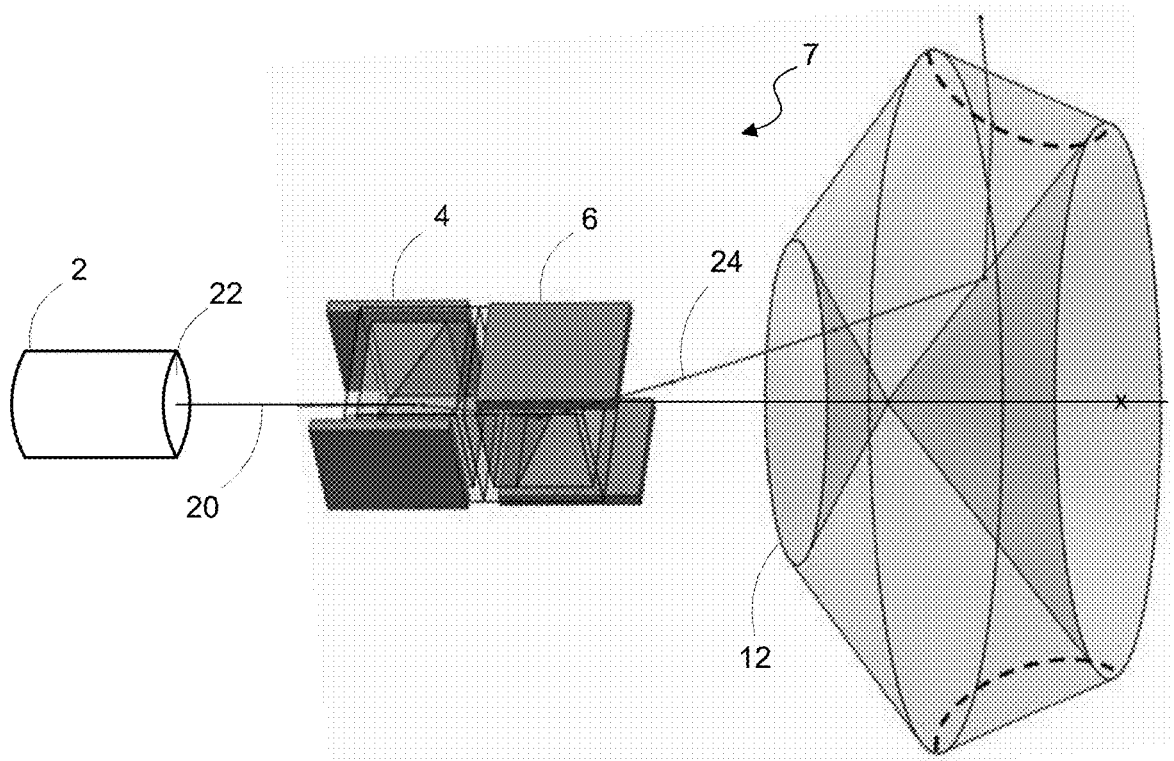
FIG. 2A is a perspective view of a beam-steering device/assembly 7 employing a double stacked electrowetting prism configuration including an optional stationary beam deflecting/shaping/modifying element 12, according to another example embodiment of the disclosure.

FIG. 2A is an illustration of a beam-steering device/assembly 7 employing a double stacked electrowetting prism configuration 4, 6 including an optional stationary beam deflecting/shaping/modifying element 12 (also referred to as axisymmetric optical element 12), according to another example embodiment of the disclosure. If the optical beam deflection angle θ (see FIG. 1A) is not sufficient for a given application, a stationary axisymmetric optical element 12 (e.g. stationary beam deflecting/shaping/modifying element 12) may be positioned at the beam exiting side of the second electrowetting prism 6 to further deflect the output beam 24, reshape it, or in some way to modify it to facilitate image acquisition and processing. Furthermore, the axisymmetric optical element 12 placed after the electrowetting prisms 4, 6 may perform functions other than beam deflection. For example, adding a curvature (dashed line 31) to an entrance or an exit surface of the optical element 12 can aid to correct beam astigmatism. Here, the stationary beam deflecting/shaping/modifying element 12 is particularly useful in side-view imaging applications.

Figure 2B:
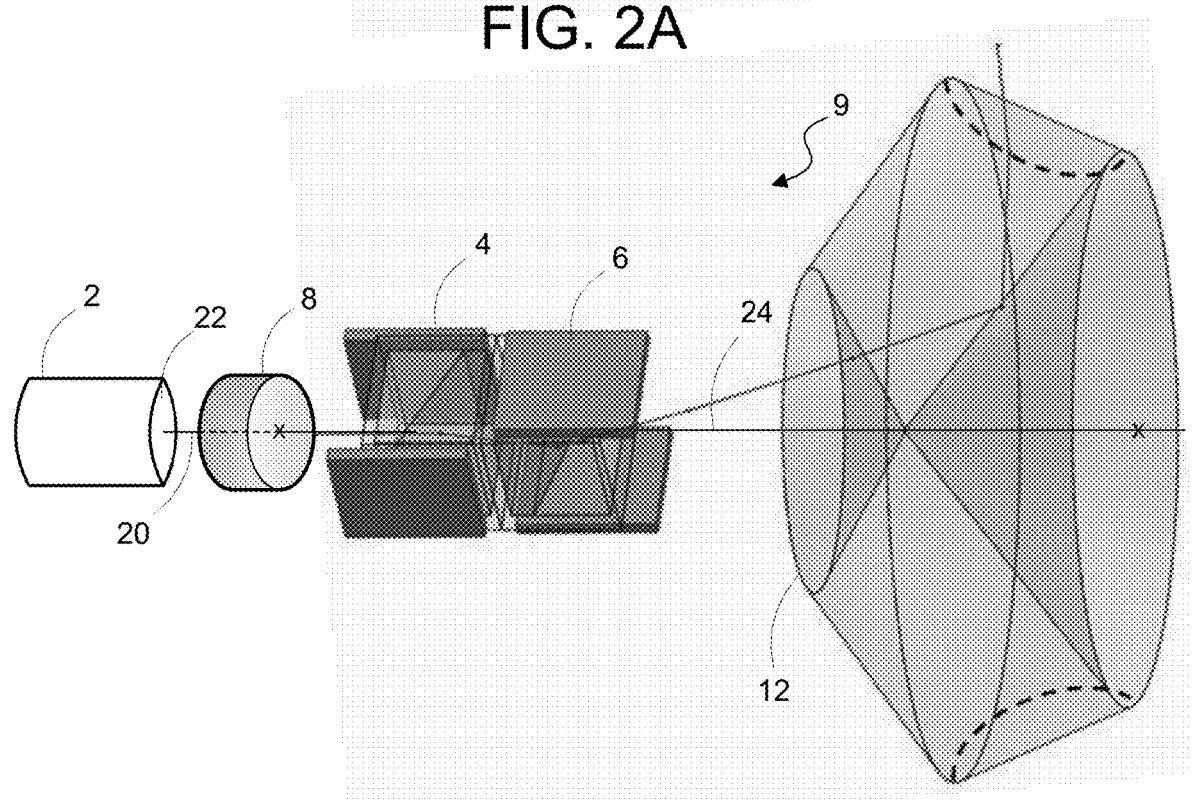
FIG. 2B is a perspective view of a beam-steering device/assembly 9 employing a double stacked electrowetting prism configuration including an optional stationary beam deflecting/shaping/modifying element 12 and an additional beam focusing component 8, according to another example embodiment of the disclosure.

FIG. 2B is an illustration of a beam-steering device/assembly 9 employing a double stacked electrowetting prism configuration 4, 6 including an optional stationary beam deflecting/shaping/modifying element 12 and an additional beam focusing component 8, according to another example embodiment of the disclosure.

Figure 2C:
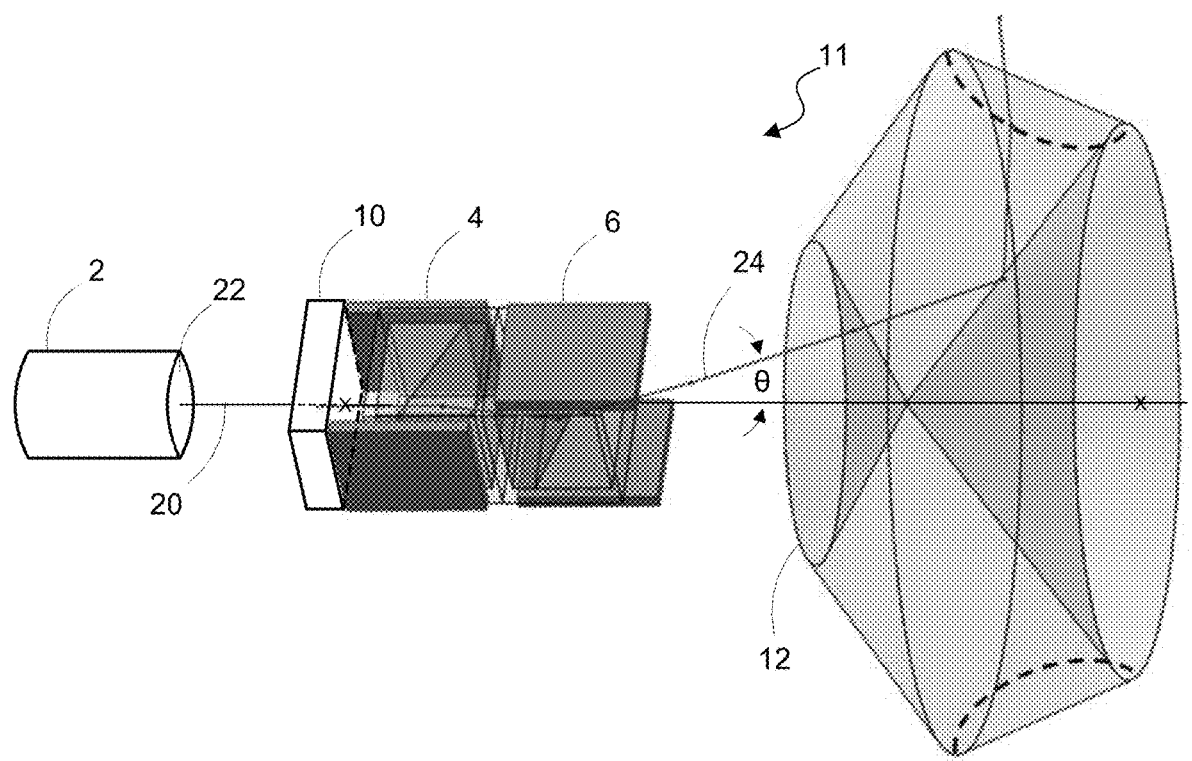
FIG. 2C is a perspective view of a beam-steering device/assembly 11 employing a double stacked electrowetting prism configuration including an optional stationary beam deflecting/shaping/modifying element 12 and an additional beam focusing component 10 integrated as part of the first electrowetting prism 4, according to another example embodiment of the disclosure.

FIG. 2C is an illustration of a beam-steering device/assembly 11 employing a double stacked electrowetting prism configuration 4, 6 including an optional stationary beam deflecting/shaping/modifying element 12 and an additional beam focusing component 10 integrated as part of the first electrowetting prism 4, according to a another example embodiment of the disclosure. Here again, the additional beam focusing component 10 may be integrated as part of the first electrowetting prism's 4 input aperture for size reduction purposes, for example.

Figure 2D:
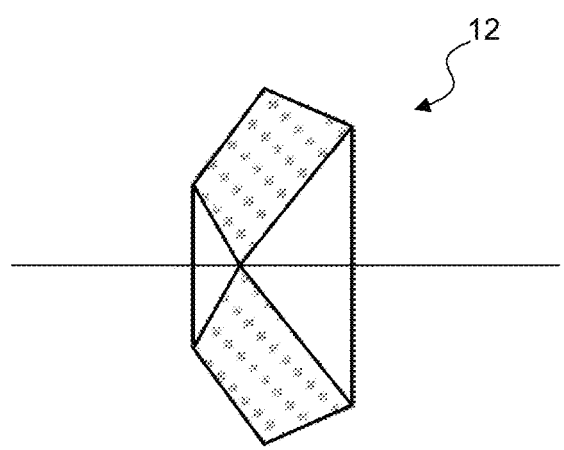
FIG. 2D is a cross-section view of the optional stationary beam deflecting/shaping/modifying element 12, according to an example embodiment of the disclosure.

FIG. 2D is a cross-section view of an optional stationary beam deflecting/shaping/modifying element 12 which is particularly useful in side-view imaging applications, according to an example embodiment of the disclosure.

Figure 3A:
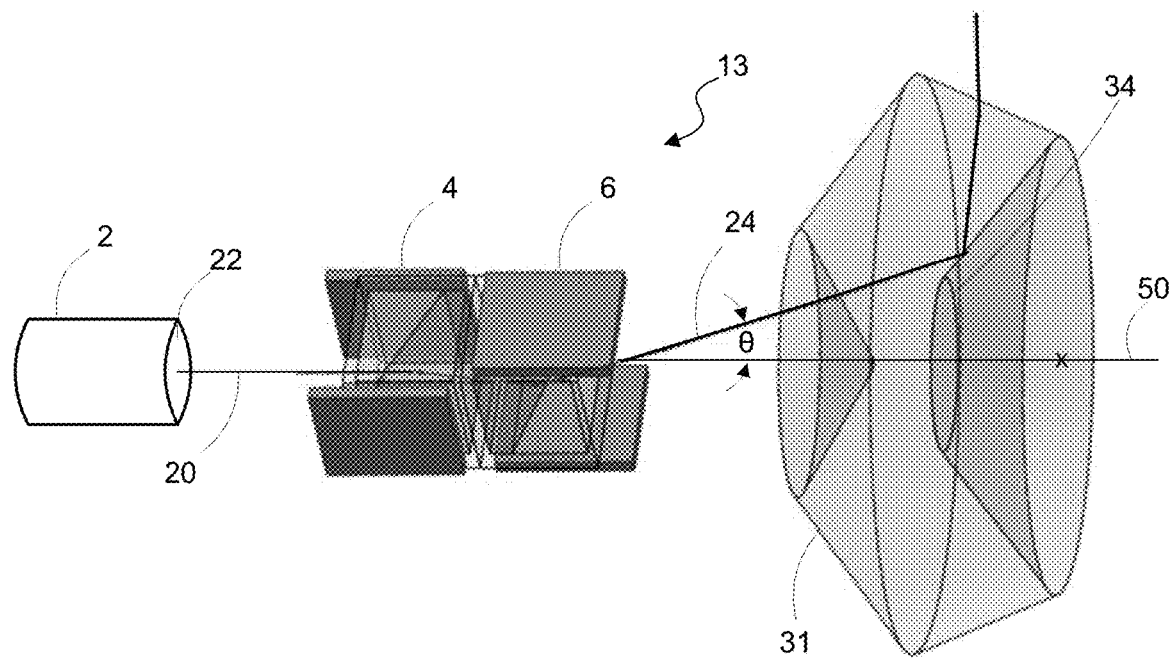
FIG. 3A is a perspective view of a beam-steering device/assembly 13 employing double stacked electrowetting prism configuration including an optional stationary beam deflecting/shaping/modifying element 31 which has an opening or transparent window 34, according to another example embodiment of the disclosure.

FIG. 3A is an illustration of a beam-steering device/assembly 13 employing a double stacked electrowetting prism configuration 4, 6 including an optional stationary beam deflecting/shaping/modifying element 31 (also referred to as axisymmetric optical element 31) which has an opening or transparent window 34 that facilitates switchable forward to side view imaging, according to another example embodiment of the disclosure. The opening or transparent window 34, positioned, for example, in a central portion of the axisymmetric optical element 12, will allow for a forward viewing imaging device with a possibility of switching to a side-viewing or a back-viewing modes (or both) by a small increase in the beam deflection angle θ so that the beam is not going through the window 34, but is reflected sideway or backwards from a conical surface. Additionally, the reflecting surface may be constructed from an electro switchable material (such as liquid crystals) so that viewing direction may be controlled by turning the mirror on and off. Here, the transparent window 34 is positioned about a center axis 50 of the beam deflecting/shaping/modifying element 12 to facilitate switching from a forward viewing mode to at least one of a side-viewing mode and back-viewing mode.

Figure 3B:
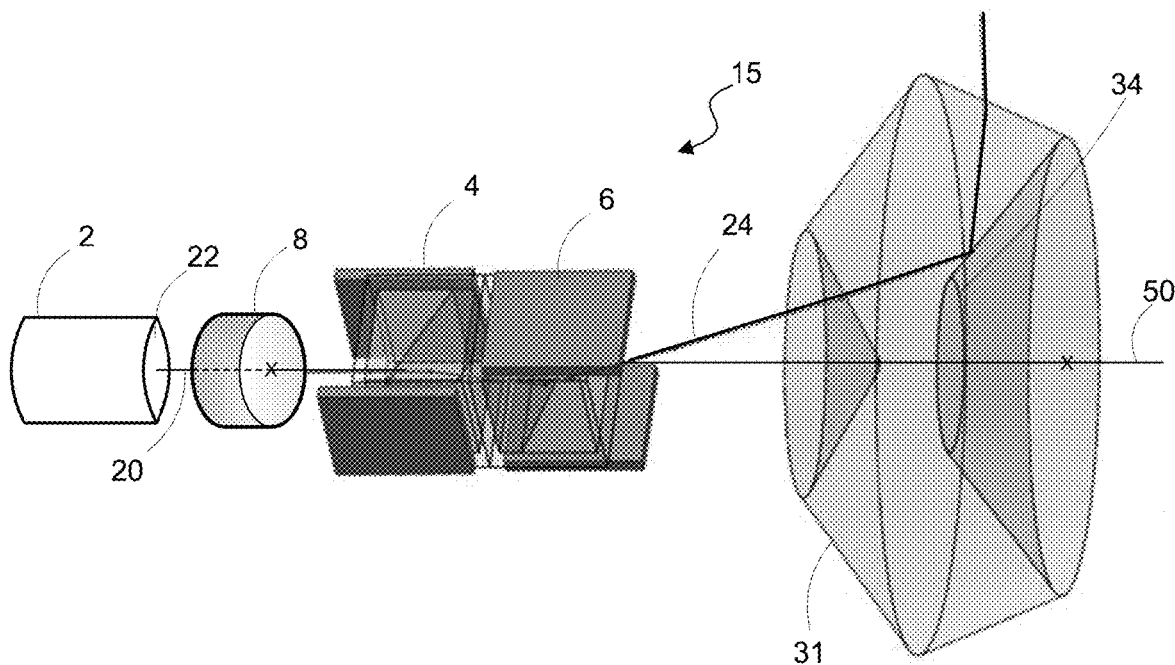
FIG. 3B is a perspective view of a beam-steering device/assembly 15 employing a double stacked electrowetting prism configuration including an optional stationary beam deflecting/shaping/modifying element 31 which has an opening or transparent window 34 and an additional beam focusing component 8, according to another example embodiment of the disclosure.

FIG. 3B is an illustration of a beam-steering device/assembly 15 employing a double stacked electrowetting prism configuration 4, 6 including an optional stationary beam deflecting/shaping/modifying element 12 which has an opening or transparent window 34 and an additional beam focusing component 8, according to another example embodiment of the disclosure. Again, the transparent window 34 is positioned about a center axis 50 of the beam deflecting/shaping/modifying element 12 to facilitate switching from a forward viewing mode to at least one of a side-viewing mode and back-viewing mode.

Figure 3C:
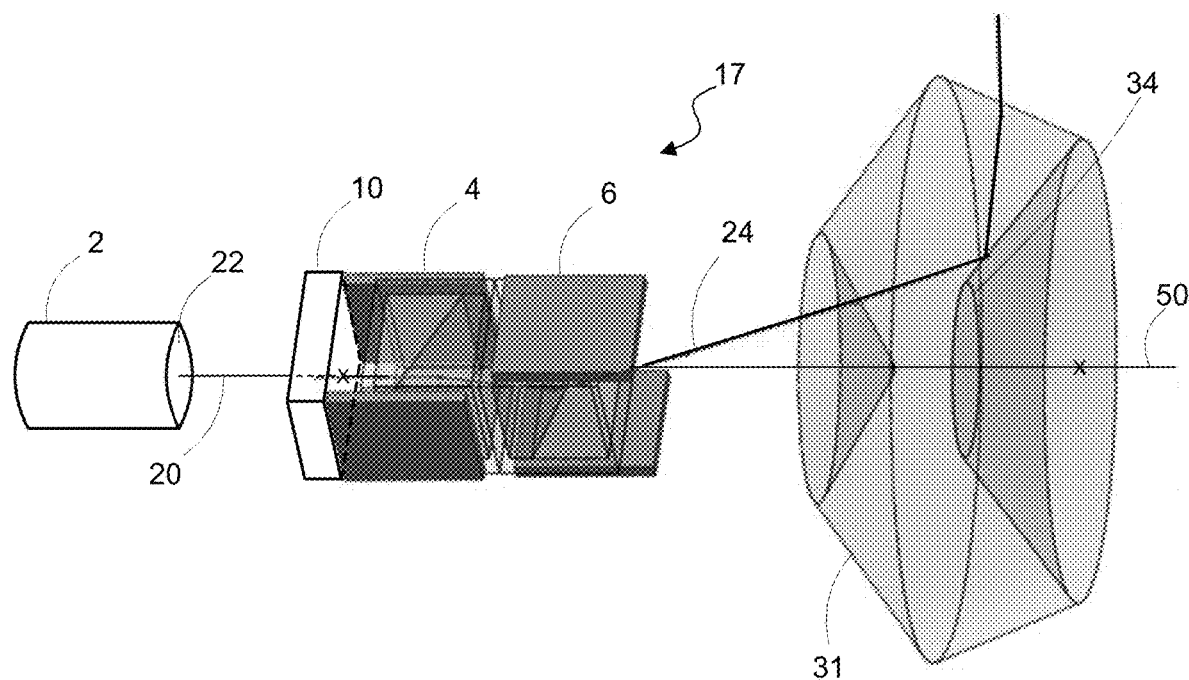
FIG. 3C is a perspective view of a beam-steering device/assembly 17 employing a double stacked electrowetting prism configuration including an optional stationary beam deflecting/shaping/modifying element 31 which has an opening or transparent window 34 and an additional beam focusing component 10 integrated as part of the first electrowetting prism 4, according to another example embodiment of the disclosure.

FIG. 3C is an illustration of a beam-steering device/assembly 17 employing a double stacked electrowetting prism configuration 4, 6 including an optional stationary beam deflecting/shaping/modifying element 31 which has an opening or transparent window 34 and an additional beam focusing component 10 integrated as part of the first electrowetting prism's beam entering aperture, according to another example embodiment of the disclosure. Again, the transparent window 34 is positioned about a center axis 50 of the beam deflecting/shaping/modifying element 31 to facilitate switching from a forward viewing mode to at least one of a side-viewing mode and back-viewing mode.

Figure 3D:
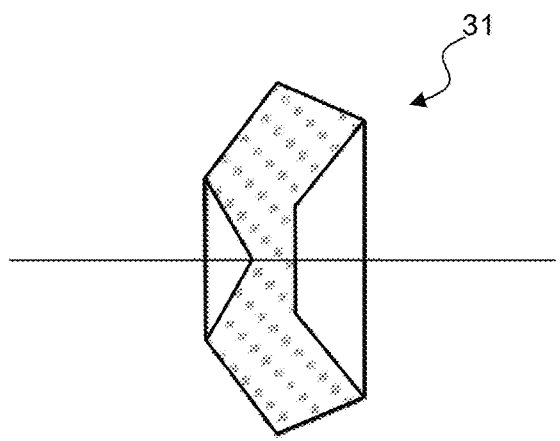
FIG. 3D is a cross-section view of the optional stationary beam deflecting/shaping/modifying element 31, which has an opening or transparent window 34 that facilitates switchable forward to side view imaging, according to another example embodiment of the disclosure.

FIG. 3D is a cross-section view of the optional stationary beam deflecting/shaping/modifying element 31, which has an opening or transparent window 34 that facilitates switchable forward to side view imaging, according to an example embodiment of the disclosure.

Figure 4A:
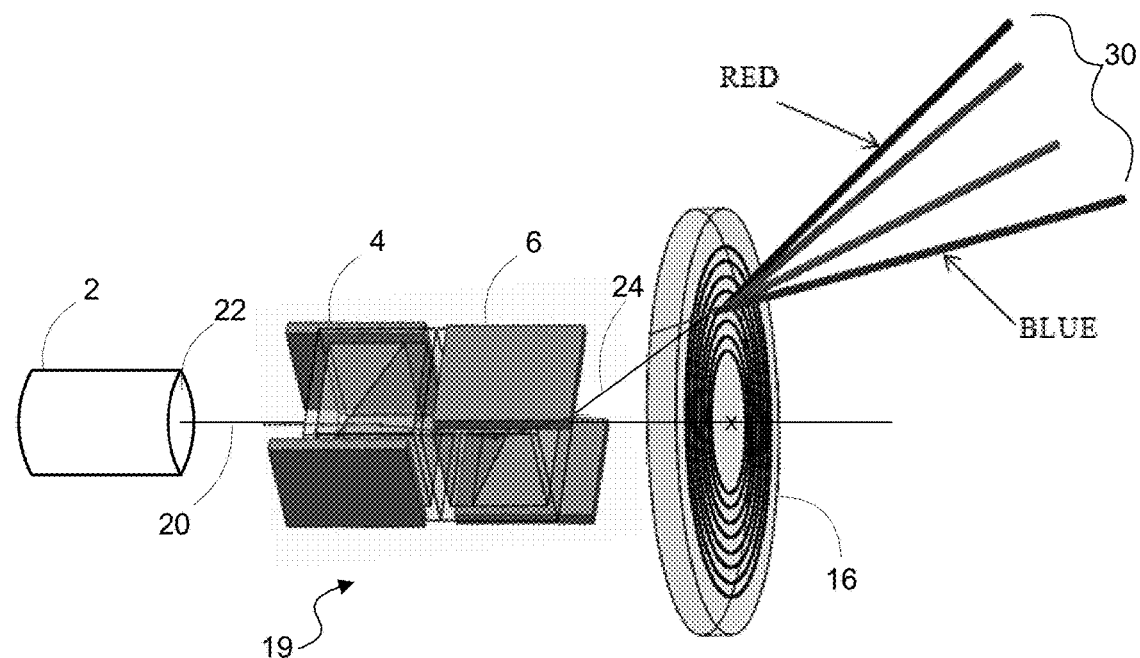
FIG. 4A is a perspective view of a beam-steering device/assembly 19 employing a double stacked electrowetting configuration including an axisymmetric diffraction grating 16, according to another example embodiment of the disclosure.

FIG. 4A is an illustration of a beam-steering device/assembly 19 employing a double stacked electrowetting prism configuration 4, 6 including an axisymmetric diffraction grating 16 used an axisymmetric optical element which creates a rotating spectrally split beam 30 for use in various SEE imaging techniques, according to another example embodiment of the disclosure.

Figure 4B:
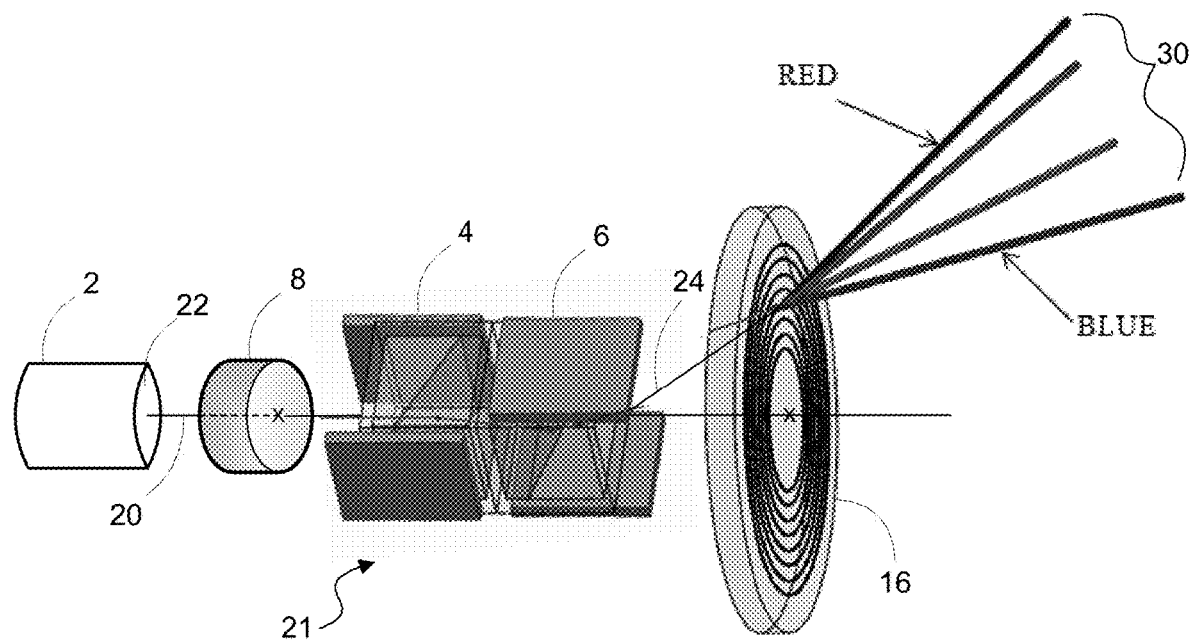
FIG. 4B is a perspective view of a beam-steering device/assembly 21 employing a double stacked electrowetting prism configuration including an axisymmetric diffraction grating 16 and an additional beam focusing component 8, according to another example embodiment of the disclosure.

FIG. 4B is an illustration of a beam-steering device/assembly 21 employing a double stacked electrowetting prism configuration 4, 6 including an axisymmetric diffraction grating 16 used an axisymmetric optical element which creates a rotating spectrally split beam 30 for use in various SEE imaging techniques and an additional beam focusing component 8, according to another example embodiment of the disclosure.

Figure 4C:
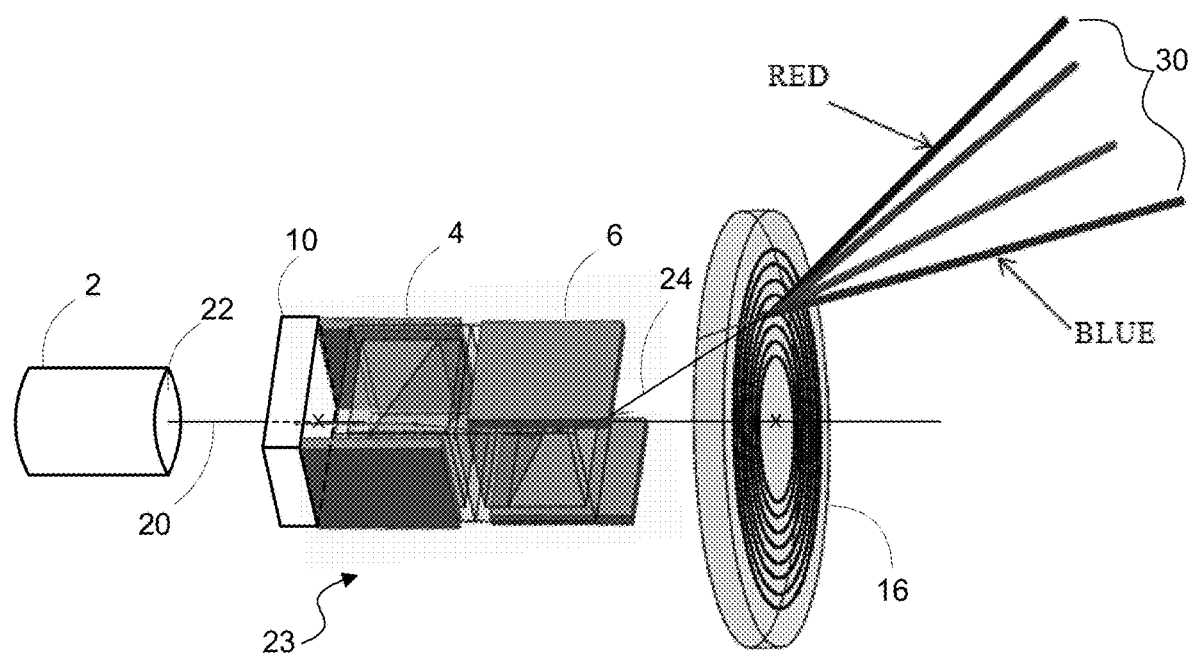
FIG. 4C is a perspective view of a beam-steering device/assembly 23 employing a double stacked electrowetting prism configuration including an axisymmetric diffraction grating 16 and an additional beam focusing component 10 integrated as part of the first electrowetting prism 4, according to a another example embodiment of the disclosure.

FIG. 4C is an illustration of a beam-steering device/assembly 23 employing a double stacked electrowetting prism configuration 4, 6 including an axisymmetric diffraction grating 16 used an axisymmetric optical element which creates a rotating spectrally split beam 30 for use in various SEE imaging techniques and an additional beam focusing component 10 integrated as part of the first electrowetting prism's 4 beam entering aperture, according to a another example embodiment of the disclosure.

Figure 5:
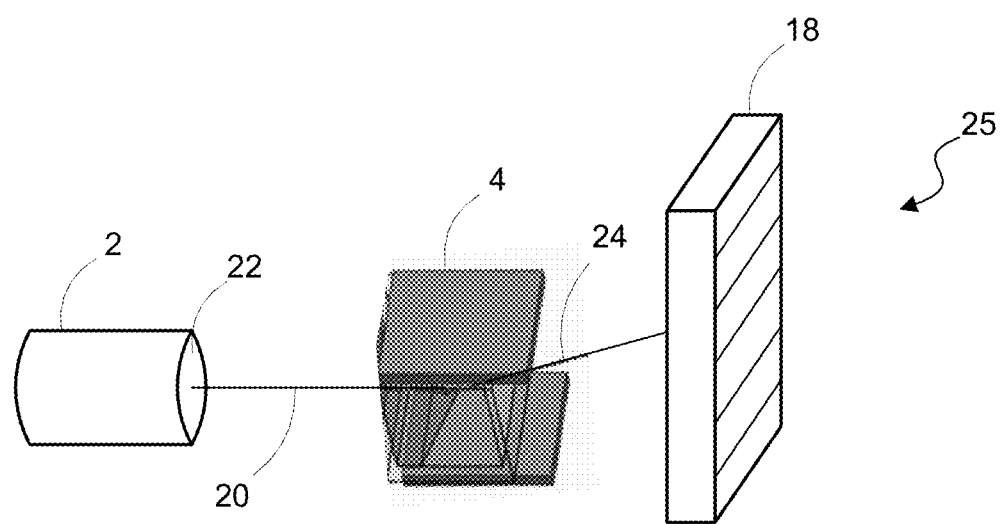
FIG. 5 is a perspective view of a beam-steering device/assembly 25 employing a single electrowetting prism 4 including a rectangular diffraction grating 18, according to a another example embodiment of the disclosure.

FIG. 5 is an illustration of a beam-steering device/assembly 27 employing a single electrowetting prism configuration 4, including a rectangular shaped diffraction grating 18, according to a another example embodiment of the disclosure. Here, the single electrowetting prism 4 is placed in front of the optic fiber end 22 with the rectangular diffraction grating 18 (as opposed to an axisymmetric element) positioned on the beam-exiting side of electrowetting prism 4 so that prism's 4 beam deflection plane is orthogonal to the rectangular grating's 18 beam dispersion plane to obtain an image using SEE imaging techniques, for example.

Figure 6:
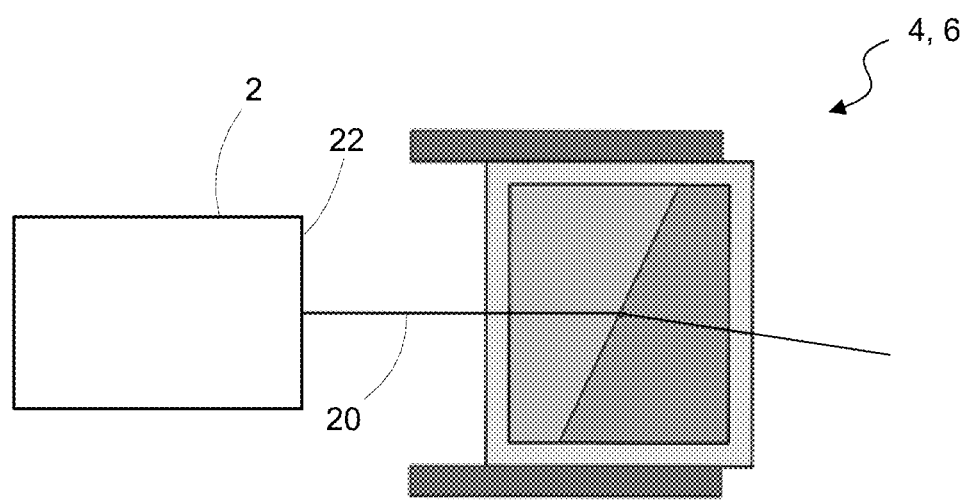
FIG. 6 is a cross-sectional side view of a single cell electrowetting prism (EWP) that is known in the art.

FIG. 6 is a cross-sectional illustration of a single cell electrowetting prism 4 and 6 (EWP) that is known in the art which is an example of an electrowetting device which may be utilized as a component in the double-stacked or single cell configurations according the embodiments of the disclosure in FIGS. 1A-C, 2A-C, 3A-C, 4A-C and 5, for example.

Several examples of such variable angle electrowetting prisms are described in U.S. Pat. No. 9,041,999 B2 to Bae et al., entitled "Electrowetting Device and Method of Manufacturing the Same", patent date May 26, 2015; U.S. Pat. No. 9,042,027 to Choi et al., entitled "Electrowetting Prism Device and Multi-view 3D Image Display Apparatus Including the Same", patent date May 26, 2015; and in publication entitled "Agile Wide-Angle Beam Steering With Electrowetting Microprisms" to Smith et al., of which the technology and know-how disclosed in each reference is herein incorporated into the subject disclosure by reference in its entirety.

Figure 7A:
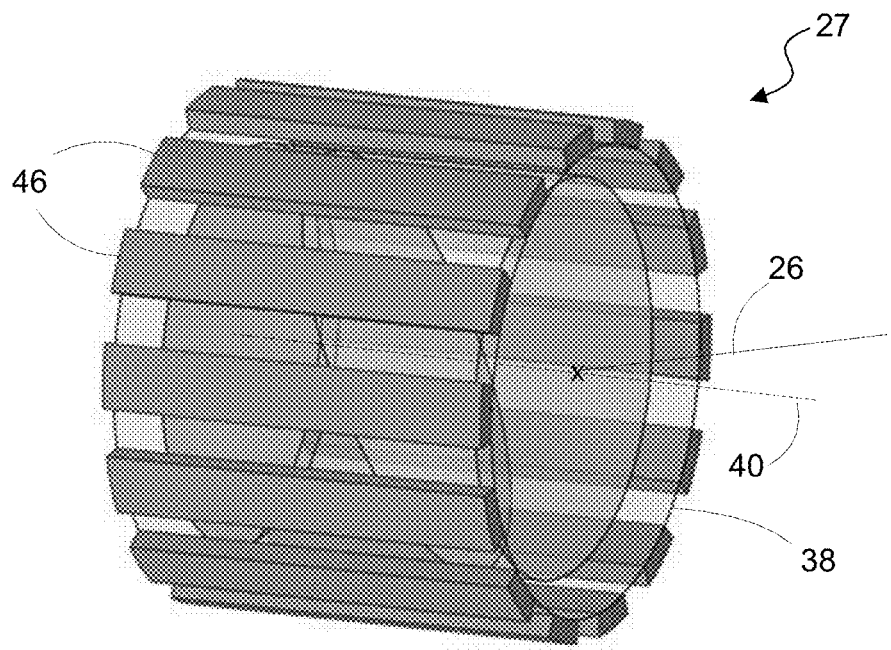
FIGS. 7A-B provide a perspective view and cross-sectional view, respectively, of a beam-steering device/assembly employing a single cylindrical electrowetting cylinder prism 27 which includes an array of electrodes, according to another example embodiment of the disclosure.
Figure 7B:
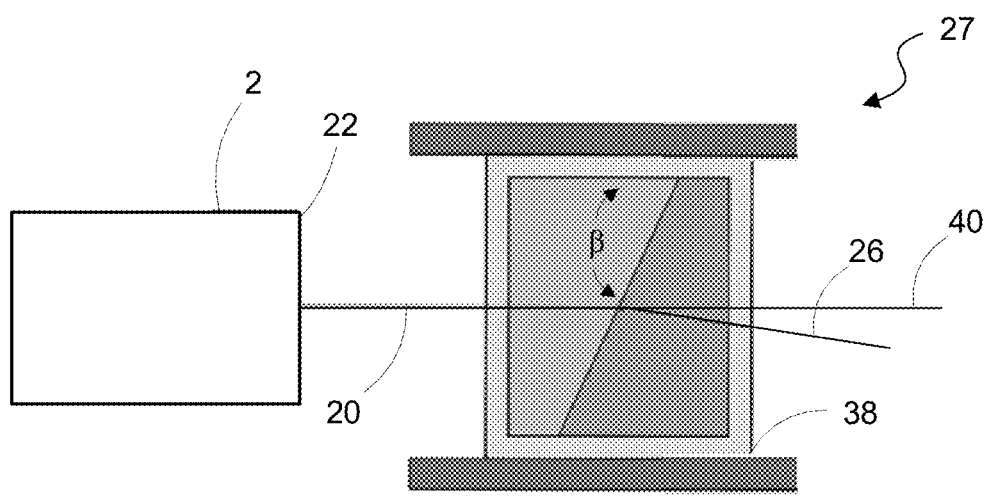

FIGS. 7A-B provide a perspective view and cross-sectional view, respectively, of a single electrowetting cylinder 27 including an array of electrodes 46 spaced apart between each other along a longitudinal length of the cylindrical wall 38. In this example embodiment, the pair of rectangular prisms 4, 6 may be replaced by a single electrowetting cylinder 27. By controlling voltages of each electrode 46 separately, the media surface angle β of the electrowetting cylinder 27 may be manipulated to rotate/move the optical beam 26 about center axis 40 in a desired pattern.

Examples of current cylindrical variable angle electrowetting prism technology and manufacture methods are described in International Patent Publication No. WO 2015/144880 to Schuhladen et al, entitled "Opto-Fluidic Component", published Oct. 1, 2015; and in publication entitled "Adaptive electrowetting lens-prism element" to Terrab, 5 Oct. 2015, vol. 23, No. 20, OPTICS EXPRESS 25838, of which the technology and know-how disclosed in each reference is herein incorporated into the subject disclosure by reference in its entirety.

Figure 8A:
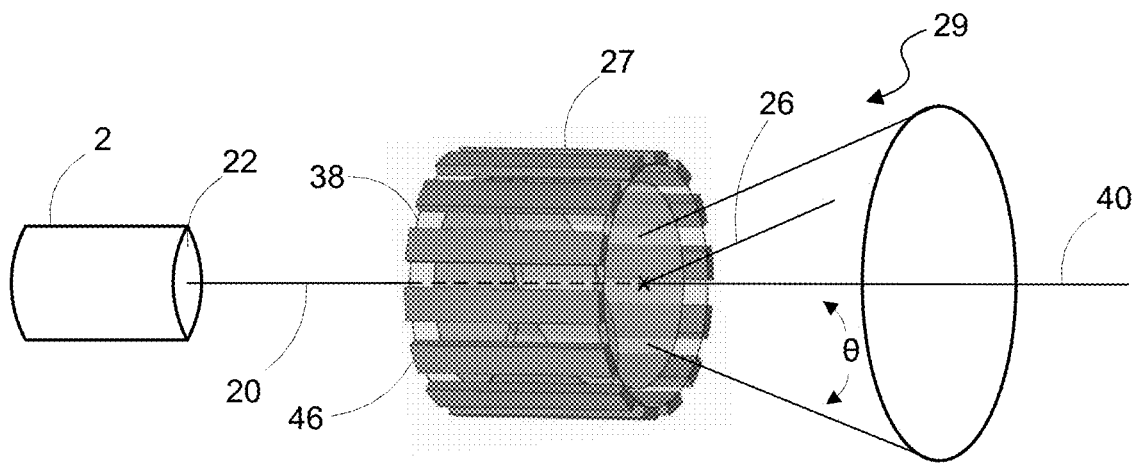
FIG. 8A is a perspective view of a beam-steering device/assembly 29 from FIGS. 7A-B employing a single cylindrical electrowetting cylinder prism configuration, according to an example embodiment of the disclosure.

FIG. 8A is a perspective view of a beam-steering device/assembly 29 employing a single cylindrical electrowetting cylinder prism 27, according to an example embodiment of the disclosure. The subject disclosure improves upon the aforementioned known variable angle electrowetting prism technology and manufacture methods by providing a single electrowetting cell 27 having a substantially cylindrical wall 38 with a plurality of electrodes 46 circumferentially positioned around the cylindrical wall 38 and spaced away from center axis 40 (see FIG. 7A). The plurality of electrodes 46 are positioned along a longitudinal length of the cylindrical wall 38 such that the plurality of electrodes 46 are generally parallel to each and parallel to the center axis 40 of the cylindrical wall 38. The plurality of electrodes 46 are generally equally spaced apart between each other along a longitudinal length of the cylindrical wall 38.

Figure 8B:
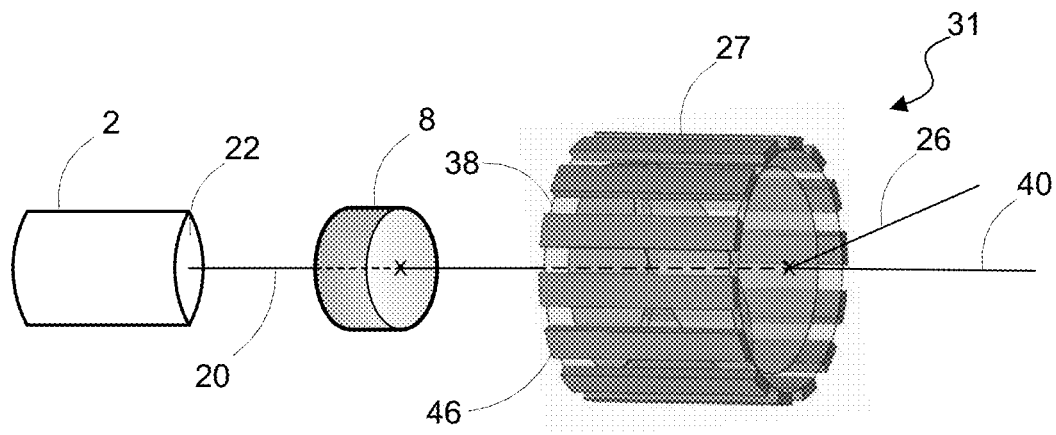
FIG. 8B is a perspective view of a beam-steering device/assembly 31 employing a single cylindrical electrowetting cylinder prism 27 including an additional beam focusing component 8, according to another example embodiment of the disclosure.

FIG. 8B is a perspective view of a beam-steering device/assembly 31 employing a single cylindrical electrowetting cylinder prism 27 including an additional beam focusing component 8, according to another example embodiment of the disclosure. In beam-steering device/assembly 33, the beam focusing optical component 8 is positioned between the distal end 22 of the optical fiber 2 and the single cylindrical electrowetting cell 27.

Figure 8C:
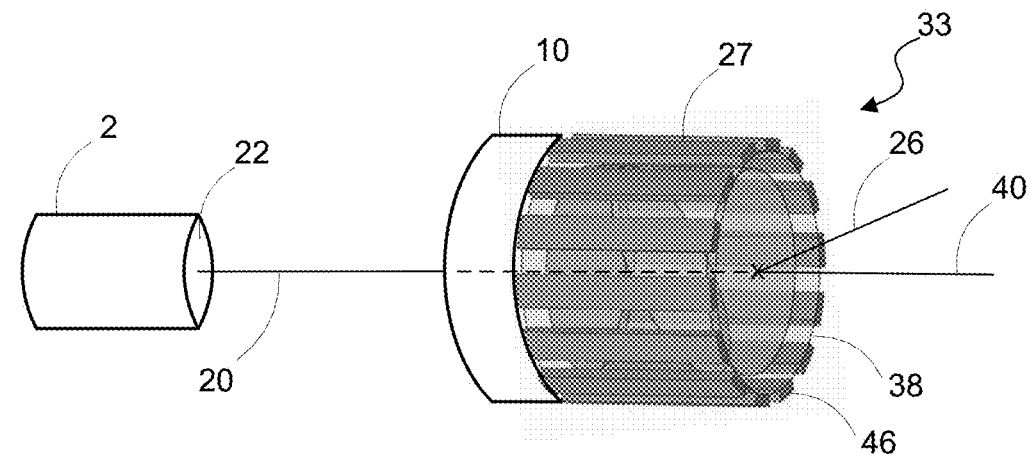
FIG. 8C is a perspective view of a beam-steering device/assembly 33 employing a single cylindrical electrowetting cylinder prism 27 including an additional beam focusing component 10 integrated as part of the first electrowetting prism, according to another example embodiment of the disclosure.

FIG. 8C is a perspective view of a beam-steering device/assembly 33 employing a single cylindrical electrowetting cylinder prism 27 including an additional beam focusing component 10 integrated together as part of the single cylindrical electrowetting cylinder prism's 27 beam entering aperture, according to another example embodiment of the disclosure.

Figure 9A:
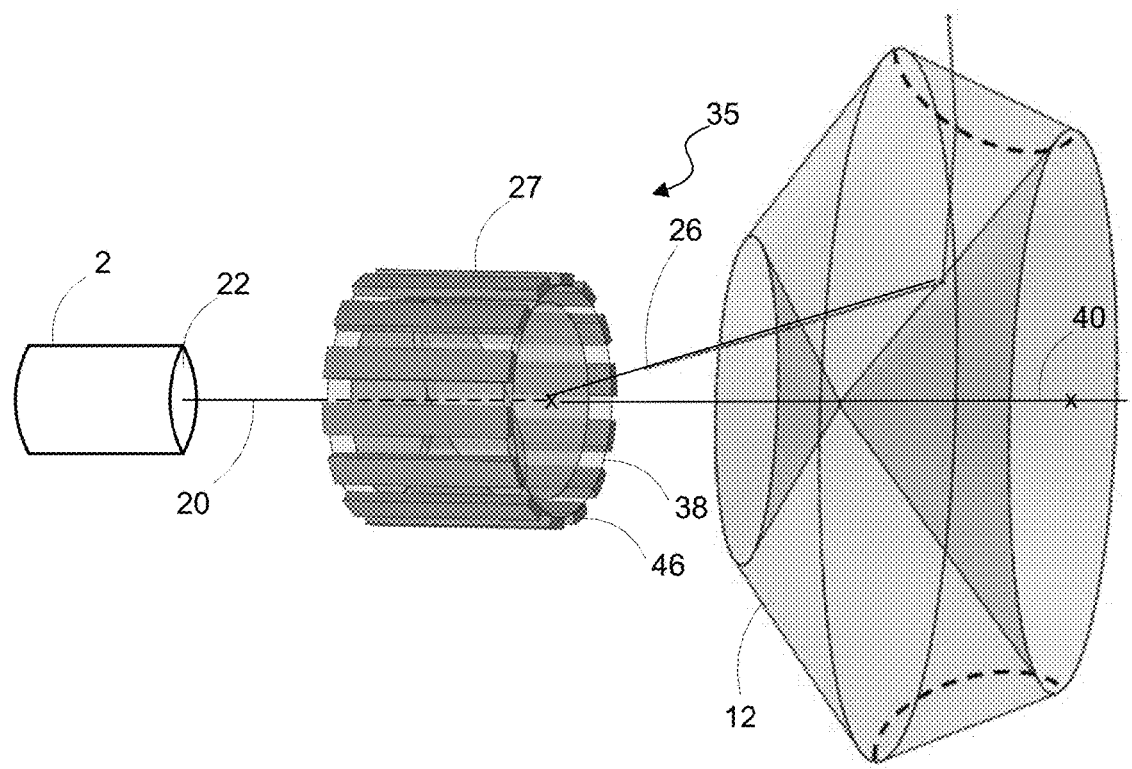
FIG. 9A is a perspective view of a beam-steering device/assembly 35 employing a single cylindrical electrowetting cylinder prism 27 including an optional stationary beam deflecting/shaping/modifying element 31, according to another example embodiment of the disclosure.

FIG. 9A is a perspective view of a beam-steering device/assembly 35 employing a single cylindrical electrowetting cylinder prism 27 including an optional stationary beam deflecting/shaping/modifying element 12, according to another example embodiment of the disclosure. Here, the additional beam deflecting/shaping/modifying element 12 is disposed to interact with the probing optical beam 26 exiting the cylindrical electrowetting cell 27.

Figure 9B:
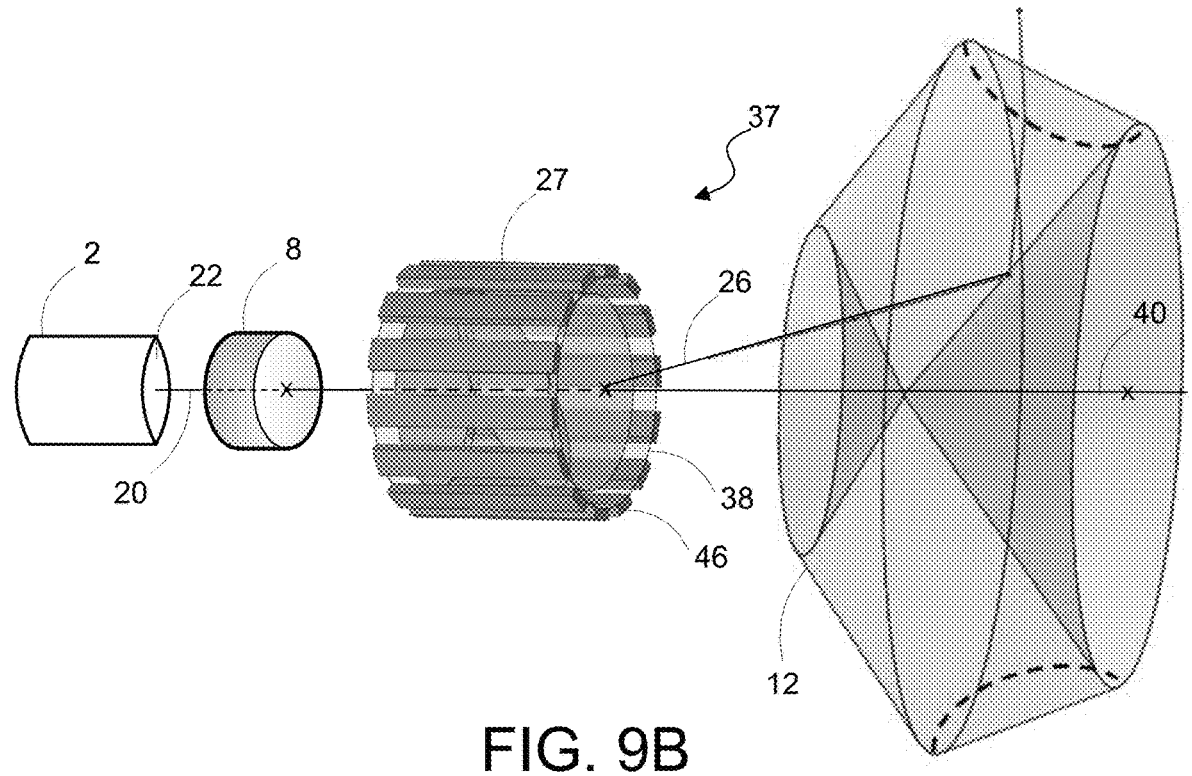
FIG. 9B is a perspective view of a beam-steering device/assembly 37 employing a single cylindrical electrowetting cylinder prism 27 including an optional stationary beam deflecting/shaping/modifying element 31 and an additional beam focusing component 8, according to another example embodiment of the disclosure.

FIG. 9B is a perspective view of a of beam-steering device/assembly 37 employing a single cylindrical electrowetting cylinder prism 27 including an optional stationary beam deflecting/shaping/modifying element 12 and an additional beam focusing component 8, according to another example embodiment of the disclosure.

Figure 9C:
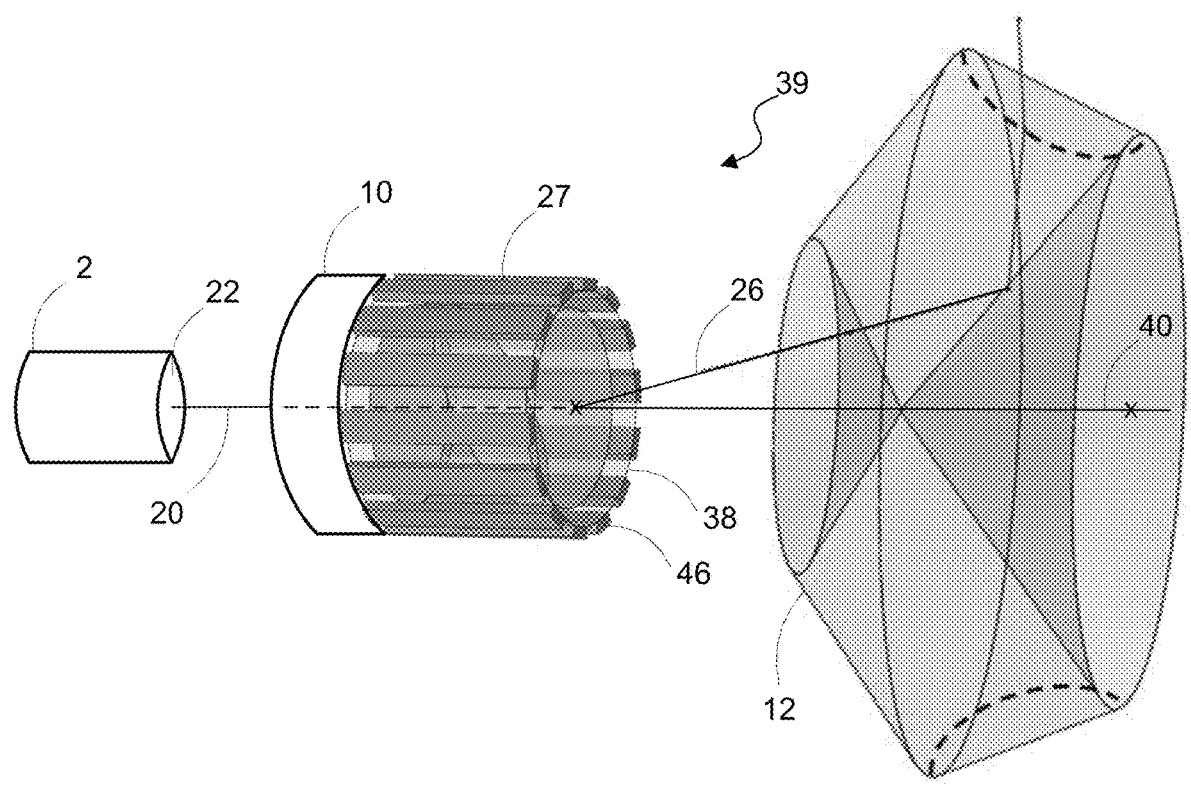
FIG. 9C is a perspective view of a beam-steering device/assembly 39 employing a single cylindrical electrowetting cylinder prism 27 including an optional stationary beam deflecting/shaping/modifying element 13 and an additional beam focusing component 10 integrated as part of the cylinder prism 27, according to a another example embodiment of the disclosure.

FIG. 9C is a perspective view of a of beam-steering device/assembly 39 employing a single cylindrical electrowetting cylinder prism 27 including an optional stationary beam deflecting/shaping/modifying element 12 and an additional beam focusing component 10 integrated as part of the single cylindrical electrowetting prism 27, according to a another example embodiment of the disclosure. Here, the beam focusing optical component 10 is integrated together with an input aperture of the circular electrowetting cell 27.

Figure 10A:
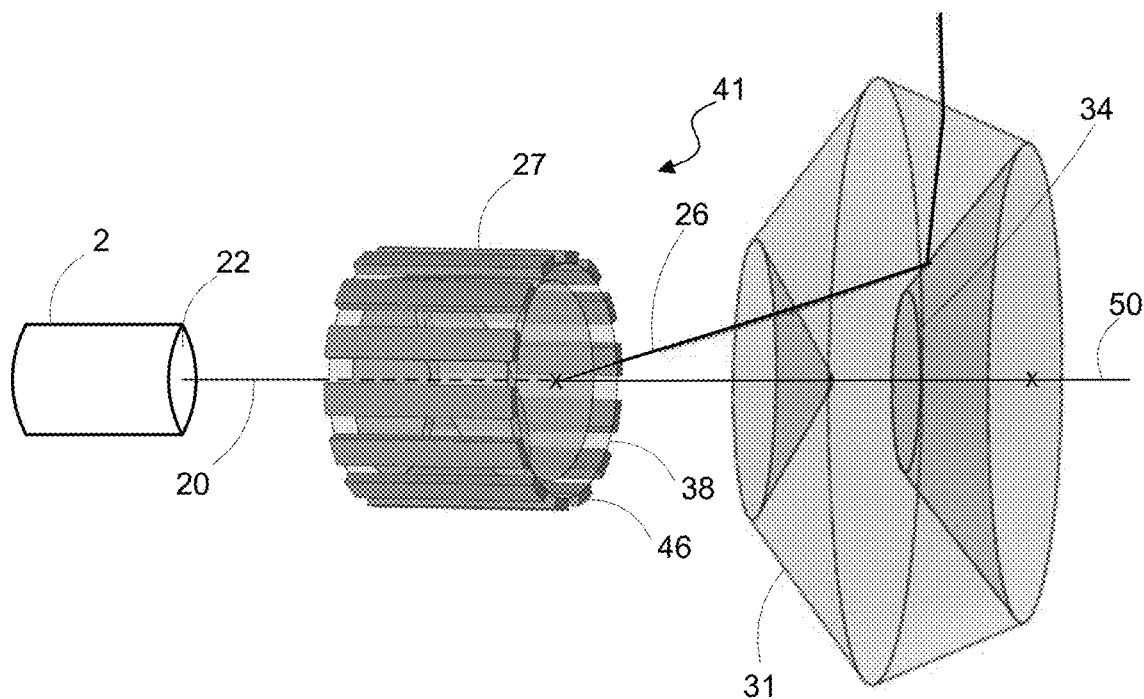
FIG. 10A is a perspective view a beam-steering device/assembly 41 employing single cylindrical electrowetting cylinder prism 27 including an optional stationary beam deflecting/shaping/modifying element 34 which has an opening or transparent window, according to another example embodiment of the disclosure.

FIG. 10A is a perspective view of a beam-steering device/assembly 43 employing a single cylindrical electrowetting prism 27 including an optional stationary beam deflecting/shaping/modifying element 31 which has an opening or transparent window 34, according to another example embodiment of the disclosure. Here, the transparent window 34 is positioned about a center axis 50 of the beam deflecting/shaping/modifying element 12 to facilitate switching from a forward viewing mode to at least one of a side-viewing mode and back-viewing mode.

Figure 10B:
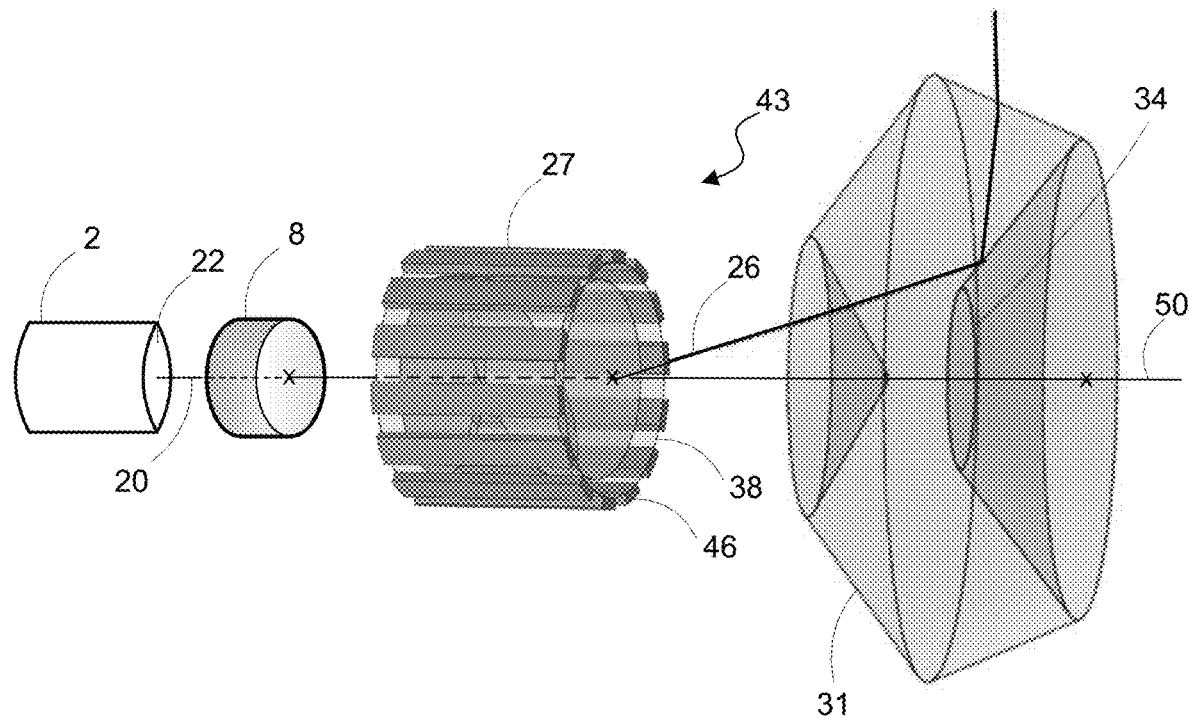
FIG. 10B is a perspective view of a beam-steering device/assembly 43 employing single cylindrical electrowetting cylinder prism 27 including an optional stationary beam deflecting/shaping/modifying element 34 which has an opening or transparent window and an additional beam focusing component 9, according to another example embodiment of the disclosure.

FIG. 10B is a perspective view of a beam-steering device/assembly 45 employing a single cylindrical electrowetting prism 27 including an optional stationary beam deflecting/shaping/modifying element 31 which has an opening or transparent window 34 and an additional beam focusing component 8, according to another example embodiment of the disclosure. Again, the transparent window 34 is positioned about a center axis 50 of the beam deflecting/shaping/modifying element 12 to facilitate switching from a forward viewing mode to at least one of a side-viewing mode and back-viewing mode.

Figure 10C:
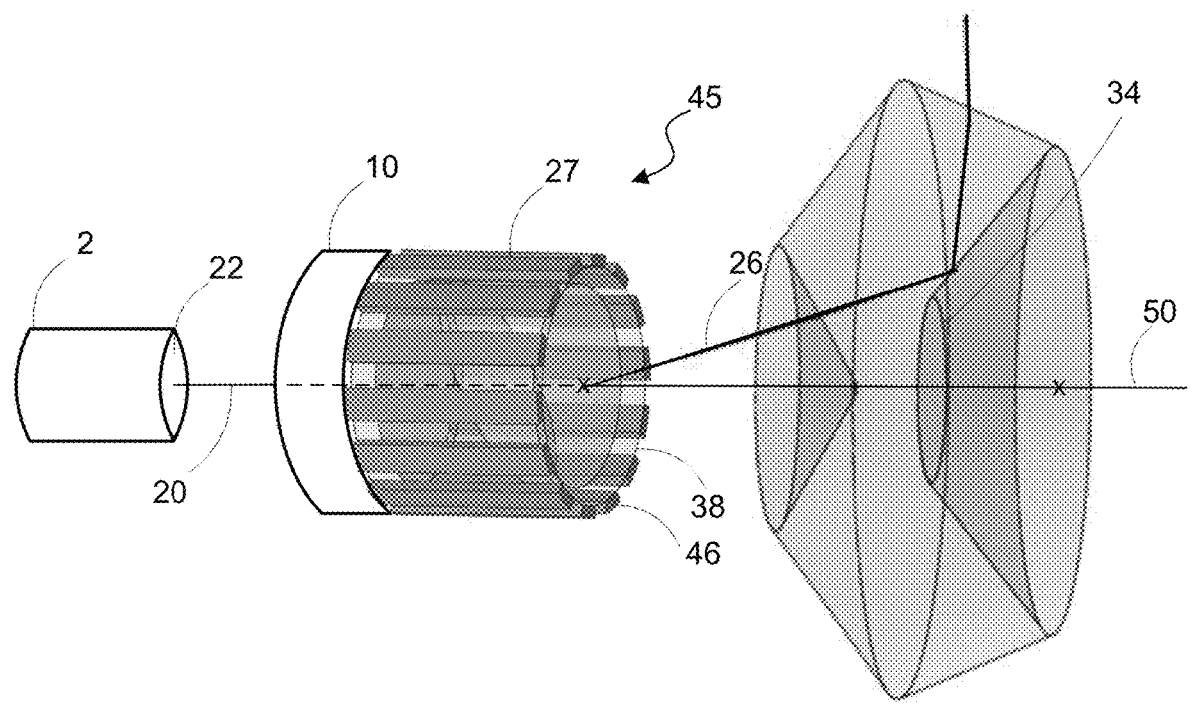
FIG. 10C is a perspective view of a beam-steering device/assembly 45 employing a single cylindrical electrowetting cylinder prism 27 including an optional stationary beam deflecting/shaping/modifying element 34 which has an opening or transparent window and an additional beam focusing component 10 integrated as part of the cylinder prism 27, according to another example embodiment of the disclosure.

FIG. 10C is a perspective view of a beam-steering device/assembly 45 employing a single cylindrical electrowetting prism 27 including an optional stationary beam deflecting/shaping/modifying element 31 which has an opening or transparent window 34 and an additional beam focusing component 10 integrated as part of the single cylindrical electrowetting cylinder prism feature 29, according to another example embodiment of the disclosure. Here, the beam focusing optical component 10 is integrated together with an input aperture of single circular electrowetting cell 27. Again, the transparent window 34 is positioned about a center axis 50 of the beam deflecting/shaping/modifying element 12 to facilitate switching from a forward viewing mode to at least one of a side-viewing mode and back-viewing mode.

Figure 11A:
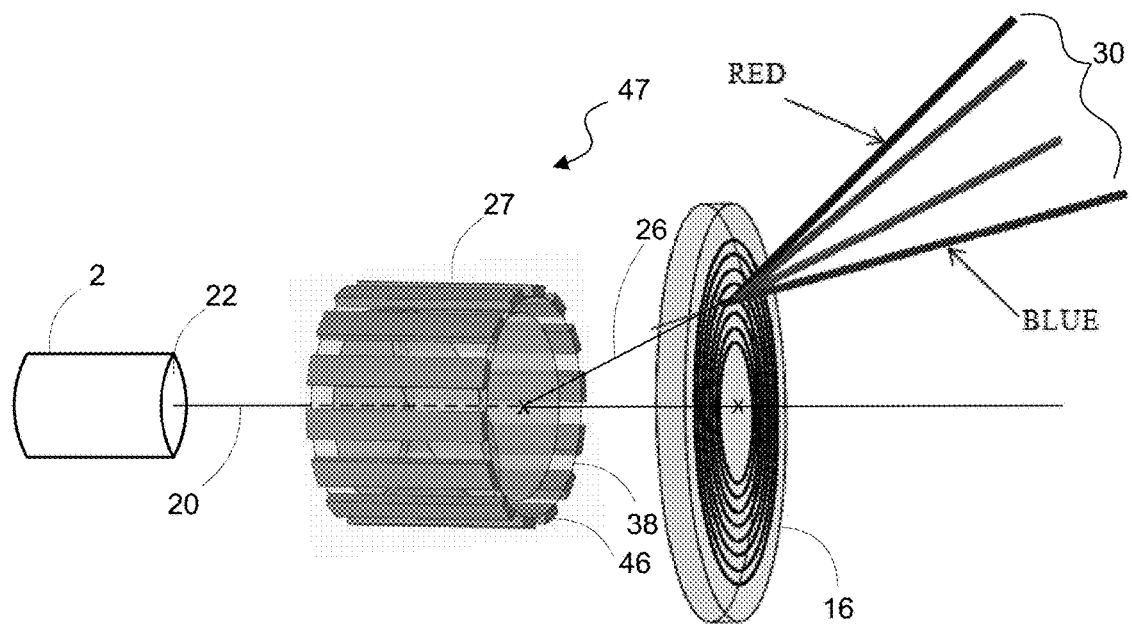
FIG. 11A is a perspective view of a beam-steering device/assembly 47 employing a single cylindrical electrowetting cylinder prism 27 including an axisymmetric diffraction grating 16, according to another example embodiment of the disclosure.

FIG. 11A is a perspective view of a beam-steering device/assembly 47 employing a single cylindrical electrowetting prism 27 including an axisymmetric diffraction grating 16 used an axisymmetric optical element which creates a rotating spectrally split beam 30 for use in various SEE imaging techniques, according to another example embodiment of the disclosure.

Figure 11B:
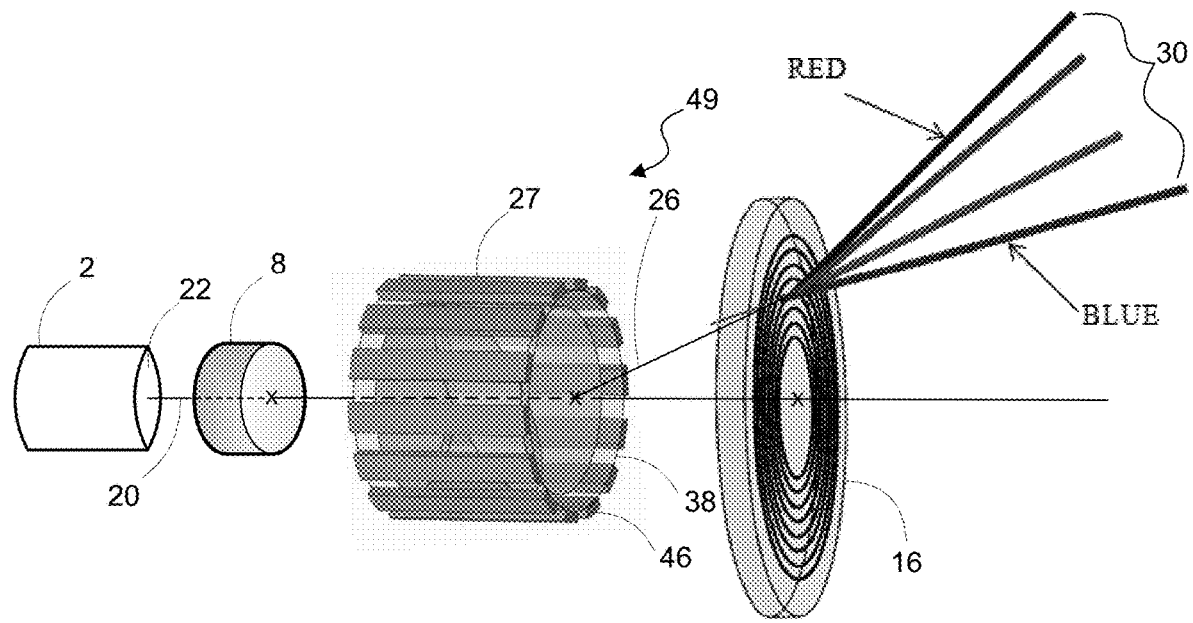
FIG. 11B is a perspective view of a beam-steering device/assembly 49 employing a single cylindrical electrowetting cylinder prism 27 including an axisymmetric diffraction grating 16 and an additional beam focusing component 8, according to another example embodiment of the disclosure.

FIG. 11B is a perspective view of a beam-steering device/assembly 49 employing a single cylindrical electrowetting prism 27 including an axisymmetric diffraction grating 16 used an axisymmetric optical element which creates a rotating spectrally split beam 30 for use in various SEE imaging techniques and an additional beam focusing component 8, according to another example embodiment of the disclosure.

Figure 11C:
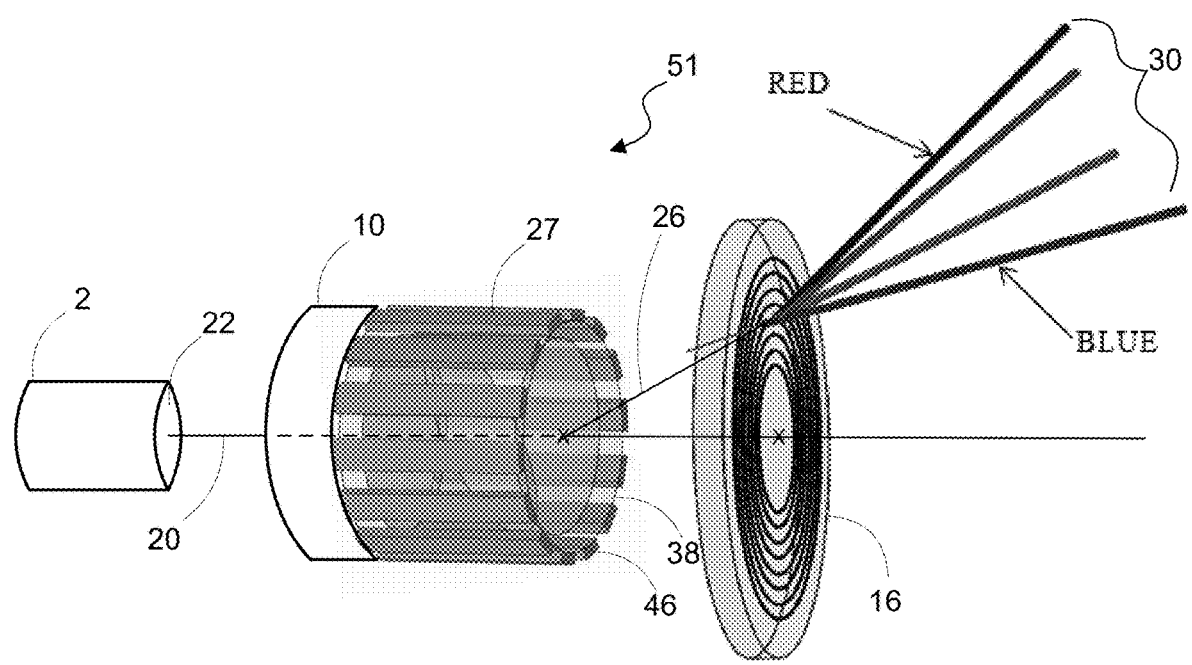
FIG. 11C is a perspective view of a beam-steering device/assembly 53 employing a single cylindrical electrowetting cylinder prism 27 including an axisymmetric diffraction grating 16 and an additional beam focusing component 10 integrated as part of the cylinder prism 27, according to a another example embodiment of the disclosure.

FIG. 11C is a perspective view of a beam-steering device/assembly 51 employing a single cylindrical electrowetting prism 27 including an axisymmetric diffraction grating 16 and an additional beam focusing component 10 integrated as part of the single cylindrical electrowetting prism's 27 beam entering aperture, according to a another example embodiment of the disclosure. Here, the beam focusing optical component 10 is integrated together with an input aperture of the single electrowetting cell 27.

A commonality between all of the above example embodiments, is there is no mechanical inertia limiting optical beam direction change, the scan pattern does not have to be a complete circle. If a surface of interest can be scanned with just a limited beam rotational angle (smaller than 360 degrees) then such a limited scan can be easily implemented through modifications to electrowetting prisms control voltage. In this case, the beam deflecting/shaping/modifying element 12 adjacent to the prisms does not have to be fully axisymmetric and may just comprise a portion of an axisymmetric element.

Compared with the prior art, the aforementioned proposed miniature endoscopic apparatuses, systems and methods utilizing electrowetting prisms 4, 6, 27 in the manner set forth in the subject disclosure have at least the following advantages over the prior art, including but not limited to:

Does not use rotating mechanical components.
Has simplified design.
Has low NURD.
Allows for dimensional scaling down to molecular level.

It is noted that though all the preceding descriptions represent imaging systems where light is traveling from the optical fiber 2 to the electrowetting prisms 4, 6 and 27 to the sample surface 44 (see FIGS. 12A-B) being imaged (such a fiber would be called an illumination optical fiber 2 or the like), and a group of systems with opposite light propagation direction, from the sample surface 44 to the fiber (such a fiber would be called a detection fiber 28; See FIG. 13) would comprise yet another set of embodiments of the present invention.

Optical Coherence Tomography (OCT) Example Embodiments and Systems

Optical coherence tomography (OCT) is an example modality of optical imaging technique that may utilize the various embodiments disclosed herein the subject application, in particular, the example embodiments disclosed in FIGS. 1A-C, 2A-C, 3A-C, 7A-B, 8A-C, 9A-C and 10A-C.

OCT is an established medical imaging technique which utilizes light to capture micrometer resolution, three-dimensional (3D) images from within optical scattering media (e.g., biological tissue sample 44). OCT is based on low-coherence interferometry, typically employing near-infrared light. The use of relatively long wavelength light allows it to penetrate into the scattering medium. Depending on the properties of the light source (superluminescent diodes, ultrashort pulsed lasers, supercontinuum lasers etc.), OCT is capable of achieving sub-micrometer resolution (with very wide-spectrum sources emitting over a ~100 nm wavelength range).

Spectrally Encoded Endoscopy (SEE) Example Embodiments and Systems

Spectrally encoded endoscopy ("SEE") is another example mode of an optical imaging technique that may utilize some of the various embodiments disclosed herein the subject application, in particular, the examples embodiments disclosed in FIGS. 4A-C, 5, 11A-C and 12A. SEE uses wavelength to encode spatial information on a sample 44, thereby allowing high-resolution imaging to be conducted through small diameter endoscopic probes capable of conducting high-definition imaging through a sub-mm diameter probe. SEE can produce high-quality images in two-dimensions and three-dimensions.

SEE can be accomplished using broad bandwidth light 130 input into one or more optical fibers 2. At the distal end of the fiber 22, a diffractive or dispersive optical component disperses the light across the sample 44, which returns back through the optic and then through optical fiber 28 (see FIG. 13). Light is detected by a wavelength detecting apparatus 170, such as a spectrometer where each resolvable wavelength corresponds to reflectance from a different point on the sample 44. The principle of the SEE technique and an SEE probe with a diameter of 0.5 mm, i.e., 500 μm have been described, for example, in D. Yelin et al., Nature Vol. 443, 765-765 (2006) as well as in U.S. Patent Publication Nos. 2007/0233396 and 2008/0013960, the entire contents of which are herein incorporated by reference.

SEE can be accomplished using a quasimonochromatic or broad bandwidth light input into a single optical fiber. At the distal end of the fiber, a diffractive or dispersive optic disperses the light across the sample, which is reflected and returns back through the optic and optical fiber. Light from the optical fiber is detected by a wavelength detecting apparatus, such as a spectrometer. By detecting the light intensity as a function of wavelength, the image may be reconstructed. SEE techniques have been described in, e.g., U.S. Pat. Nos. 7,843,572, 8,145,018, 6,341,036, 7,796,270 and U.S. Patent Publication Nos. 2008/0013960 and 2011/0237892, the entire contents of which are herein incorporated by reference.

Figure 12A:
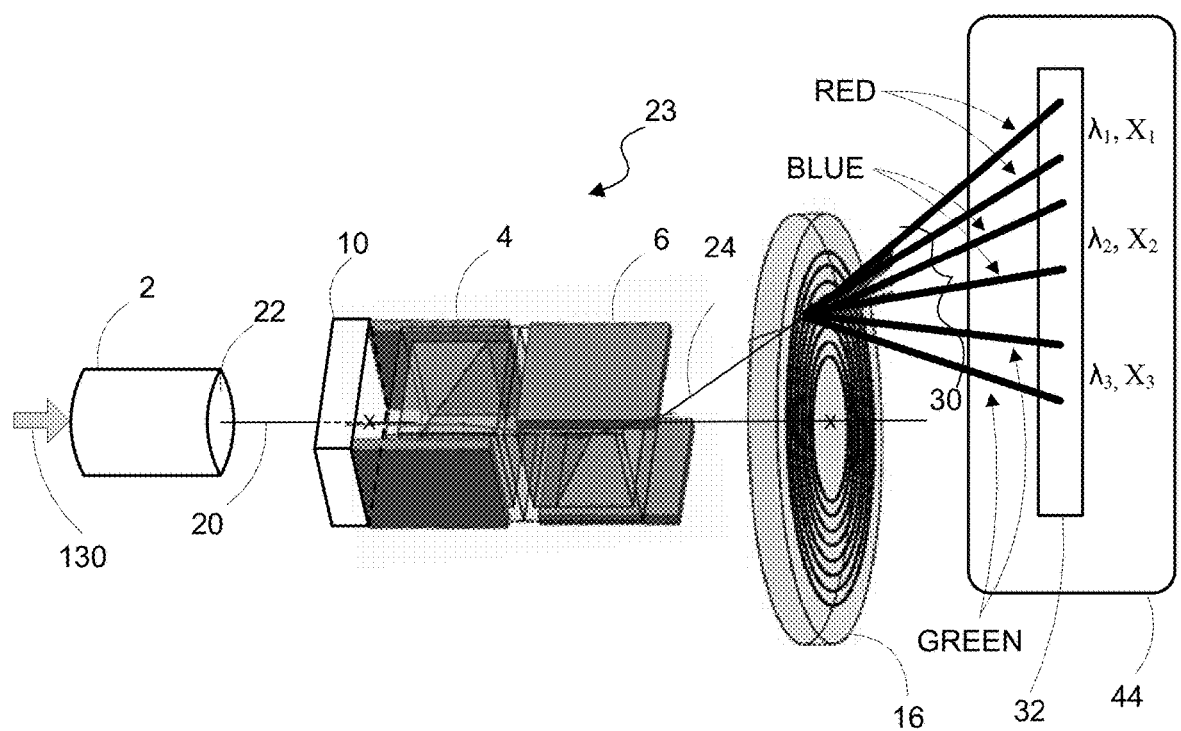
FIG. 12A provides a perspective view of the example beam-steering device/assembly 23 from FIG. 4C, which may utilized in example SEE imaging system 100, according to an example system embodiment of the disclosure.

FIG. 12A is a perspective view of the beam-steering device/assembly 23 (from FIG. 4) employing a double stacked electrowetting prism configuration 4, 6 including an axisymmetric diffraction grating 16 used an axisymmetric optical element which creates a rotating spectrally split beam 30 for use in various SEE imaging techniques and an additional beam focusing component 10 integrated as part of the first electrowetting prism's 4 beam entering aperture, according to a another example embodiment of the disclosure.

In this example embodiment, the beam-steering device/assembly 23 (also referred to as SEE probe 25) can include an optical fiber 2, optional detection fiber 28 (see FIG. 13), an integrated focusing lens 10, double-stacked EWPs 4, 6, and a diffraction grating 16 used as an axisymmetric optical element which creates a rotating spectrally split beam 30 for SEE imaging. Broadband light 130 (or other electro-magnetic radiation) can be delivered to the integrated focusing lens 10 and double-stacked EWPs 4, 6 through the optical fiber 2. The light (or other electro-magnetic radiation) can then be diffracted by the grating 16. The light scattered back from the object (e.g., tissue 44) can be collected by optical fiber 2 or the optional detection fiber 28, which is discussed in further detail later, infra (see FIG. 13).

Figure 12B:
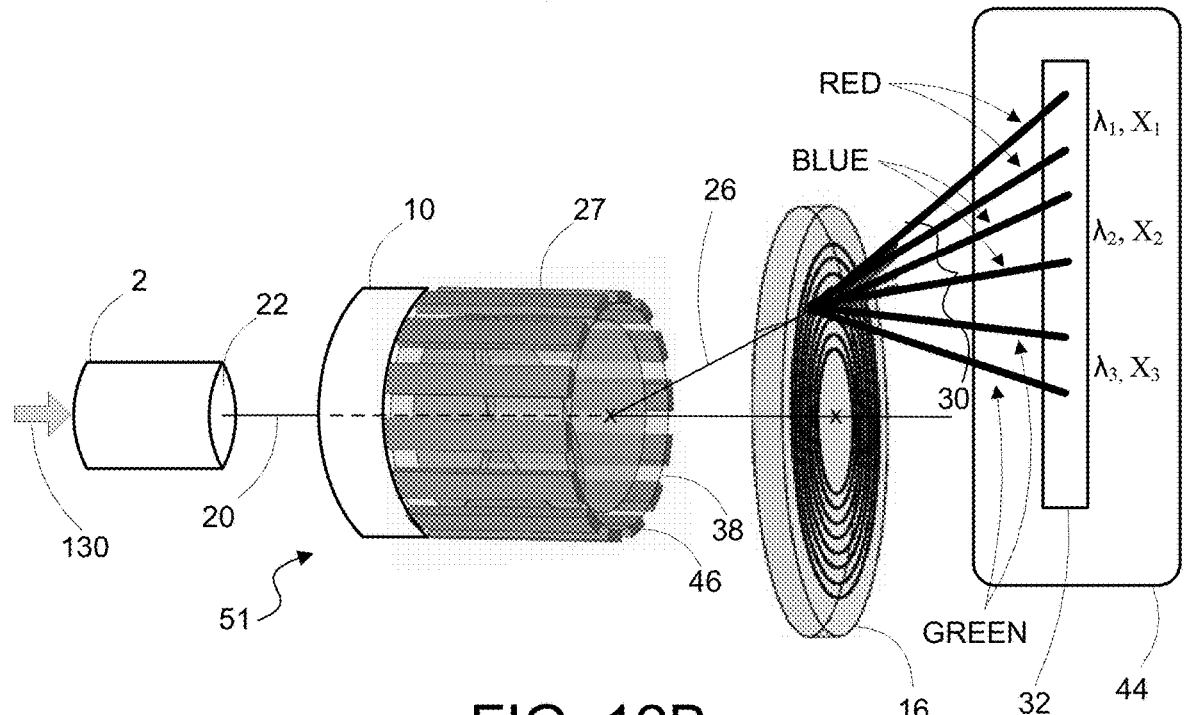
FIG. 12B provides a perspective view of the example beam-steering device/assembly 51 from FIG. 11C, which may be utilized in the example SEE imaging system 100, according to an example system embodiment of the disclosure.

FIG. 12B is a perspective view of a beam-steering device/assembly 51 (from FIG. 11C) employing a single cylindrical electrowetting cylinder prism 27 including an axisymmetric diffraction grating 16 and an additional beam focusing component 10 integrated as part of the cylinder prism 27, according to a another example embodiment of the disclosure. Here, the axisymmetric diffraction grating 16 is used an axisymmetric optical element which creates a rotating spectrally split beam 30 for use in various SEE imaging techniques.

In this example embodiment, the beam-steering device/assembly 51 (also referred to as SEE probe 51) can include an optical fiber 2, optional detection fiber 28 (see FIG. 13), an integrated focusing lens 10, single cylindrical electrowetting cylinder prism 27, and a diffraction grating 16 used as an axisymmetric optical element which creates a rotating spectrally split beam 30 for SEE imaging. Broadband light 130 (or other electro-magnetic radiation) can be delivered to the integrated focusing lens 10 and single cylindrical electrowetting cylinder prism 27 through the optical fiber 2. The light (or other electro-magnetic radiation) can then be diffracted by the grating 16. The light scattered back from the object (e.g., tissue 44) can be collected by optical fiber 2 or the optional detection fiber 28, which is discussed in further detail later, infra (see FIG. 13).

Figure 13:
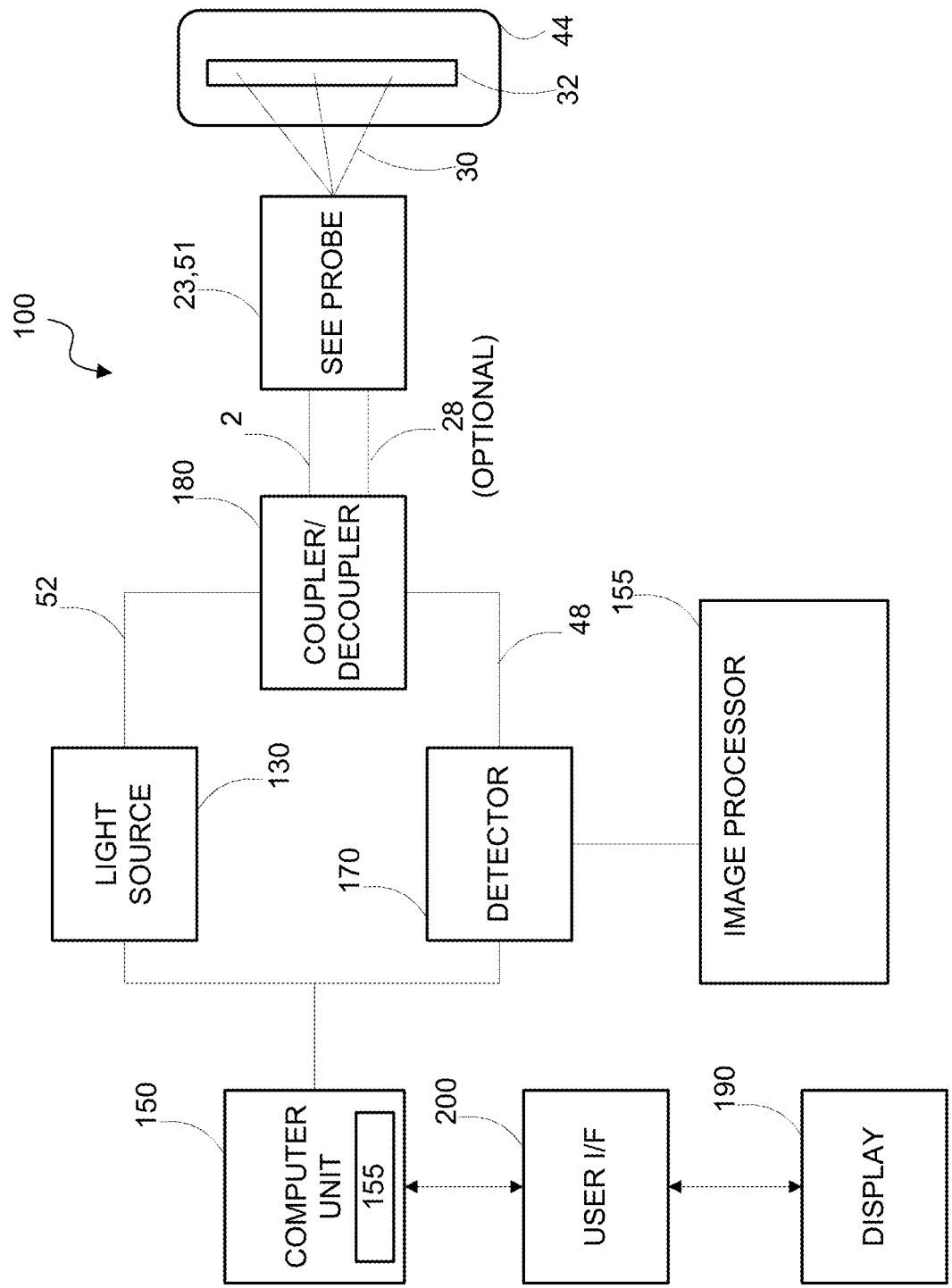
FIG. 13 provides a diagram of an example SEE imaging system 100 which may utilize the multiple example embodiments of beam-steering devices from FIGS. 4A-C and 11A-C, according to an example system embodiment of the disclosure.
Figure 14:
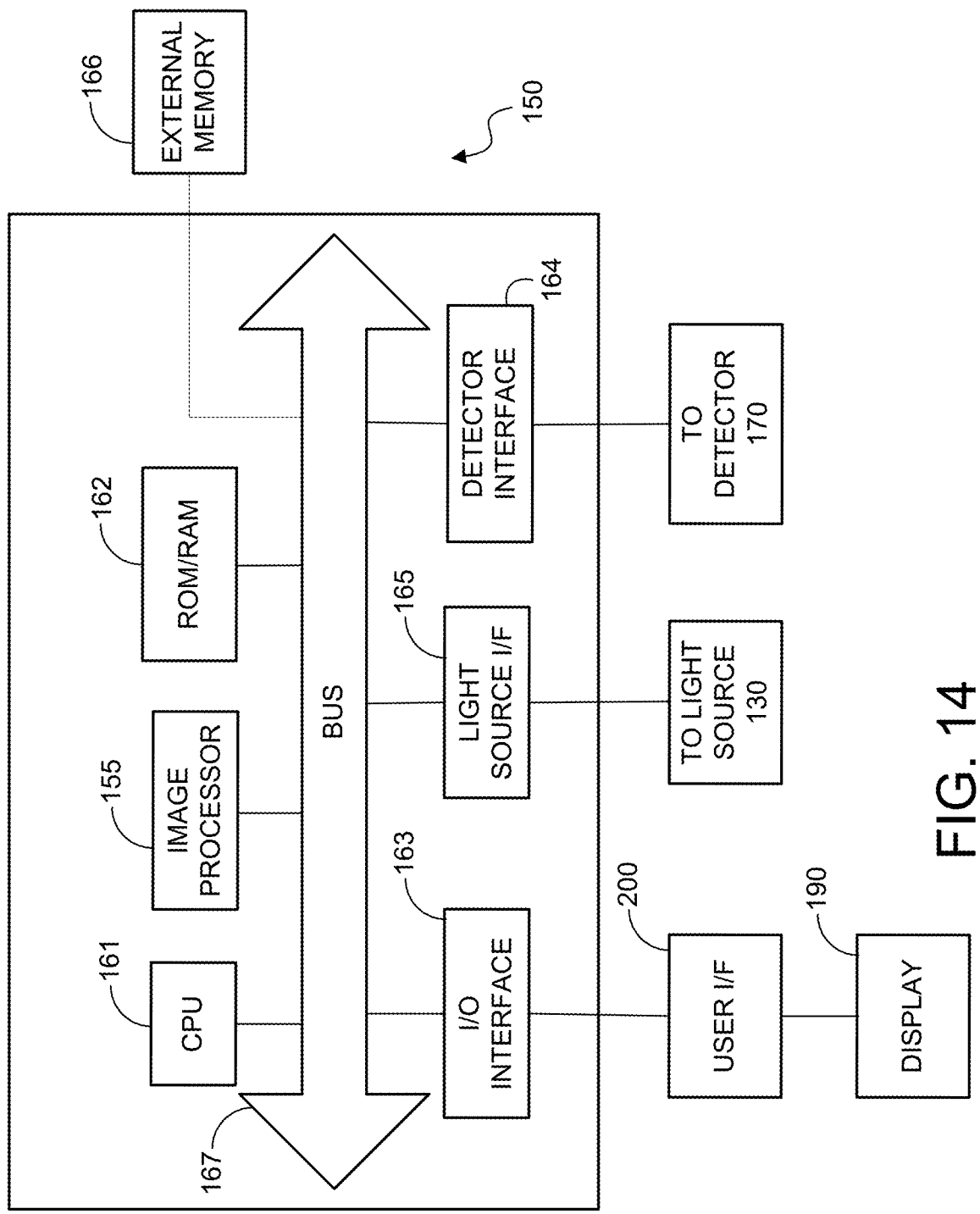
FIG. 14 is an illustration of an example computer unit/arrangement 150, according to an example system embodiment of the disclosure.

FIG. 13 is a diagram of an example SEE system 100 that includes the example SEE probes 23, 51 from FIGS. 12A-B. Broadband light from a light source 130 (or other electro-magnetic radiation) and illumination optical fiber 52 can be coupled to into a light guiding component via a coupler 180, and then delivered to the SEE probes 23, 51. After illumination of the diffracted light 30 (e.g., red, green, and blue light) on the sample 44 (e.g., a tissue or in vivo sample), light is reflected, scattered, photoluminescence by the sample 44. Light (or other electro-magnetic radiation) reflected from the specimen 44 can be coupled back to the SEE probes 23, 51, and transferred to the coupler 180 via detection optical fiber 2, or in the alternative detection optical fiber 28. Then, the light (or other electro-magnetic radiation) can be delivered to a detector 170, such as a spectrometer via the detection optical fiber 48, where the spectrum of the reflected light can be analyzed. In another alternative embodiment, an acquired spectrum can be divided into multiple sub-spectra, each of which represents color spectra, for example Red and Blue, (or in the alternative Red, Blue and Green). The sub-spectra can be processed and combined into a single color line image of the specimen.

The optical light beam 24, 26 exiting the EWP 6 or 27 (or other electro-magnetic radiation) can be diffracted by the grating component 16, and each wavelength λ can be focused on a unique spatial location on the specimen tissue 44, as shown in FIGS. 12A-B as $X_1$, $X_2$, and $X_3$ for wavelengths $\lambda_1$, $\lambda_2$, and $\lambda_{3m}$, as an example. Therefore, the light 30 (or other electro-magnetic radiation) can be focused into a line 32 (shown as spectrally-encoded line in FIGS. 12A-B), rather than onto a point. The location and angle of the optical fiber 2 relative to the lens 10 can be adjusted so that at least one of the wavelengths of the illumination light is co-linear to the lens optical axis after the grating 16. Light (or other electro-magnetic radiation) reflected by the tissue 44 can be provided back to the coupler 180 via detection optical fiber 2 or otherwise optical fiber 28, and then can be delivered to the detector 170 via optical fiber 48. At the detector/spectrometer 170, the spectrum of the returning light (or other electro-magnetic radiation) can be read out, which can be used to generate a line image of the tissue using an image processor 155 via computer 150 (also see FIG. 14).

The broadband light has sufficient bandwidth to allow for spatial resolution along the spectrally dispersed dimension. In some embodiments, the broadband light is a broadband visible light sources that includes a blue band of light (including wavelength λB1 to λBN), a green band of light (λG1 to λGN), and a red band of light (λR1 to λRN). For example, the blue band contains 400-500 nm light, the green band contains 500-600 nm light, and the red band contains 600-800 nm. In other embodiments, the wavelengths of the broadband light are optimized for identifying specific features such as blood, tissue, etc., and may extend into the near-IR region.

According to various examples embodiments, the light guiding component may be optical fiber 2 or some other optical waveguide which is connected to the SEE probes 23, 51. For instance, the optical fiber 2 may be a single-mode fiber, multi-mode fiber or double clad fiber. Thus, according to various exemplary embodiments, multi-cladding fiber can be utilized in the multiple disclosed embodiments. Multi-cladding fiber may act as if it has different core diameters depending on the light propagating direction. Thus, such multi-cladding fiber may be used as both the illumination optical fiber 2 and the detection optical fiber 28.

The grating 16 may be fabricated by techniques such as dry-etching, wet-etching, nano-imprint, and soft lithography. The grating 16 may be, but is not limited to, a binary grating, a blazed grating, or a holographic grating.

As shown in FIG. 12B, the collected light is delivered to the detector/spectrometer 170 via the optical fiber 2 or detection fiber 28, through decoupler 180 and then optical fiber 48. The detector/spectrometer 170 obtains 2D spectral data for the spectrally dispersed light, where the spectrally dispersed light corresponds to both spatial and image information from the illuminated region of the sample 44.

After the detector/spectrometer 170, one or more detectors detect the collected light, an image processor 155 generates a 2D image from the data. In other embodiments, two, three, four or more 2D images are formed using SEE probes 23, 51 with appropriate overlapping wavelengths or orders of dispersed light to create a 'color' image based on the different orders or positions. See, for example WO WO2015/116939 or U.S. patent application Ser. No. 15/418, 329, each of which is incorporated by reference in their entirety.

In some embodiments, the SEE probe 23, 51, which may be either a forward view or side view probe, is a disposable probe. In these embodiments, the illumination optical fiber 2 and direction detection optical fiber 28 may be detachable. With this exemplary function, the SEE probe 23, 51 may be disposable in order to ensure sterility Moreover, other system level approaches to acquiring the image from the SEE probe 23, 51 according to the exemplary embodiment shown in the system diagram FIG. 13. For example, the light source 1300 outputs light of broadband spectrum (or other electro-magnetic radiation). The range of the wavelength can be within the visible region, which is from 400 nm thorough 800 nm. However, other wavelengths may also be used.

In the example imaging system 100, the light source 130 can be directly guided or otherwise provided into the optical fiber 2, which can also be called an illumination fiber 2. The light scattered back from the sample object 44 (e.g., tissue) can be collected by a detection fiber 28 which can be connected to coupler 180. The detection optical fiber 28 can be connected to a detector/spectrometer 170.

To operate the example imaging system of FIG. 13, a user (e.g., a doctor, nurse, or technician) can connect a front-view SEE probe 23, 51 to a computer unit 150 (see also FIG. 14) that can be programmed and configured to specifically detect and/or determine which of the two front-view SEE probes is connected, and can store the information into computer memory 162. The computer unit/arrangement 150 can include a central processing unit 161, image processor 155, rom/ram data storage memory 162, input/output interface 163, detector interface 164, light source interface 165 and data external memory 166. In the data storage 162, software which configures the central processing unit 161 to perform the determinations and various functions for the user to operate the imaging system 100 can be pre-installed.

According to other example embodiments of the present disclosure, the exemplary SEE probe 23, 51 can facilitate a view in a forward direction, which can add an additional value to various endoscopic imaging systems 100. For example, the SEE probe 23, 51 according to various example embodiments of the present disclosure can be useful in in vivo applications. The example probe(s) 23, 51 can be configured for use in vivo, and, with a small size thereof, provide advantage over other large conventional probes that can require a more complex and invasive procedure for obtaining image data. Further, the example SEE probe(s) 23, 51 as described herein can be useful for imaging in locations traditional endoscope cannot access such as in hands, fingers, feet, and other body areas where a traditional probe is too large to fit.

The example embodiments are described with visible light, but the example embodiments of the present disclosure are not limited to the use of visible light. For instance, IR light or UV light may be used, as well as other electromagnetic radiations.

In referring to the description, specific details are set forth in order to provide a thorough understanding of the examples disclosed. In other instances, well-known methods, procedures, components and circuits have not been described in detail as not to unnecessarily lengthen the present disclosure.

System Computer, Processor, Memory and Software Related Disclosure

The various embodiments provided in the subject disclosure may also be realized by one or more computers 150 that reads out and executes computer executable instructions (e.g., one or more programs) recorded on a transitory or non-transitory storage medium to perform the functions of one or more of the above-described embodiments and/or that includes one or more circuits for performing the functions of one or more of the above-described embodiments, and by a method performed by the computer 150 of the system or apparatus by, for example, reading out and executing the computer executable instructions from the storage medium to perform the functions of one or more of the above-described embodiments and/or controlling the one or more circuits to perform the functions of one or more of the above-described embodiments. The computer system 150, for example, is part of or attached to the image processor 155 and may obtain and modify information received from an imaging detector and an optional second detector.

In one embodiment, the computer unit/arrangement 150 includes one or more computer unit(s) and one or more display unit(s) which may be connected to the image processor 150 via a high definition multimedia interface (HDMI). Optionally, a separate image server is another computer unit connected to the computer unit/arrangement 150 connected via an Ethernet cable or the wireless access point.

FIG. 13 is an illustration of the computer unit/arrangement 150 where commands may be transmitted to one or more processor(s) 161 via a user interface unit/arrangement 200. The computer unit/arrangement 150 may include an I/O interface 163 in which command are received via one or more an included or separately attached touch panel screen 190, keyboard, mouse, joy-stick, ball controller, and/or foot pedal. A user/operator may cause a command to be initiated so as to observe or gather information about a subject which may be inside a human body through an exemplary front-view SEE probe 23, 51 using the computer unit/arrangement 150. For example, when the user inputs a command, the command is transmitted to the CPU 161 for execution thereby.

The computer unit/arrangement 150 may include a CPU 161, image processor unit 155, ROM/RAM 162, I/O interface 163, detector interface 164 and light source interface 165. It is further noted that the computer unit/arrangement 150 may also comprise one or more devices. The computer unit/arrangement 150 may include one or more general purpose computers or may include application specific processors, such as an ASIC, DSP, FPGA, GPU, FPU, etc.

The computer unit/arrangement 150 may be programmed to apply exemplary image processing such as noise reduction, coordinate distortion correction, contrast enhancement and so on. After or even during the image processing is performed, the data may be transmitted from the computer unit/arrangement 150 to a display 190. The display 190 may display, for example, the individual images obtained from a single mode or a composite color image according to various exemplary embodiments of the present disclosure. The display 190 may also display other information than the image, such as the date of observation, what part of the human body is observed, the patient's name, operator's name and so on.

The CPU 161 is configured to read and perform computer-executable instructions stored in the ROM/RAM 162. The computer-executable instructions may include those for the performance of the methods and/or calculations described herein. The ROM/RAM 162 includes one or more non-transitory computer readable and/or writable media, and may include, for example, a magnetic disc (e.g., a hard disk), an optical disc (e.g., a DVD, a Blu-ray), a magneto-optical disk, semiconductor memory (e.g., a non-volatile memory card, flash memory, a solid state drive, SRAM, DRAM), an EPROM, an EEPROM, etc. ROM/RAM 162 may store computer-readable data and/or computer-executable instructions. The components of the computer unit/arrangement 150 may communicate via a bus 167.

The I/O interface 163 provides communication interfaces to input and output devices 200, which may include a keyboard, a display, a mouse, a printing device, a touch screen, a light pen, an optical storage device, a scanner, a microphone, a camera, a drive, communication cable and a network (either wired or wireless).

The detector interface 164 also provides communication interfaces to input and output devices, such as the detector/ spectrometer 170. The detector 170 may include a detection system such as the spectrometer 170, components within the spectrometer, for example a photomultiplier tube (PMT), a photodiode, an avalanche photodiode detector (APD), a charge-coupled device (CCD), multi-pixel photon counters (MPPC), or other and also components that provide information about the state of the probe such as a rotary encoder, motor drive voltage, thermocouple, etc. Also, the function of detector 170 may be realized by computer executable instructions (e.g., one or more programs) recorded on a ROM/RAM 162.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

The foregoing merely illustrates the principles of the disclosure. Various modifications and alterations to the described exemplary embodiments will be apparent to those skilled in the art in view of the teachings herein. Indeed, the arrangements, systems and methods according to the exemplary embodiments of the present disclosure can be used with any SEE system or other imaging systems, and for example with those described in U.S. Pat. Nos. 6,341,036; 7,796,270; 7,843,572; 7,859,679; 8,045,177; 8,145,018; 8,780,176; 8,812,087; 9,295,391; and 9,254,089 and PCT publications WO2015/116951 and WO2015/116939, the disclosures of which are incorporated by reference herein in their entireties.

The foregoing merely illustrates the principles of the invention. Various modifications and alterations to the described embodiments will be apparent to those skilled in the art in view of the teachings herein. Indeed, the arrangements, systems and methods according to the exemplary embodiments of the present invention can be used in connection with SEE or other imaging systems including those referenced above in U.S. Pat. Nos. 7,843,572; 8,145,018; 6,341,036; 7,796,270; and U.S. Patent Application Publication Nos. 2008/0013960 and 2011/0237892. It will thus be appreciated that those skilled in the art will be able to devise numerous systems, arrangements and methods which, although not explicitly shown or described herein, embody the principles of the invention and are thus within the spirit and scope of the present invention. In addition, to the extent that the prior art knowledge has not been explicitly incorporated by reference herein above, it is explicitly being incorporated herein in its entirety. All publications referenced herein above are incorporated herein by reference in their entireties.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the disclosure has been described with reference to example embodiments, it is to be understood that the present disclosure is not limited to the disclosed example embodiments. The scope of the following claims is to be accorded the broadest interpretation so as to encompass all such modifications and equivalent structures and functions.

What is claimed:

1. A rotation-free beam-steering device for manipulating optical beams, the beam-steering device comprising:
   at least one electrowetting cell having at least one side wall defining an inner space, the at least one side wall having a lining adjacent to the inner space, and a liquid at least partially filling the inner space, the liquid having at least one controlled surface not in contact with the wall lining, the liquid having a contact angle with the wall lining, the at least one controlled surface being disposed to interface with an optical beam exiting from a distal end of an optical fiber at an incidence angle, at least two electrodes separated from the inner space by the lining,
   wherein an electrical potential on the at least two electrodes is controlled to adjust the contact angle of the liquid bounding the at least one controlled surface; and wherein the beam-steering device is configured and adapted to rotate or move the optical beam exiting the at least one electrowetting cell in a non-planer pattern.

2. The rotation-free beam-steering device according to claim 1, further comprising a beam focusing optical component positioned between the distal end of the optical fiber and the at least one electrowetting cell.

3. The rotation-free beam-steering device according to claim 2, wherein the beam focusing optical component is integrated together with an input aperture of the at least one electrowetting cell.

4. The rotation-free beam-steering device according to claim 1, further comprising an additional beam deflecting/shaping/modifying element disposed to interact with the probing optical beam exiting the at least one electrowetting cell.

5. The rotation-free beam-steering device according to claim 4, wherein the beam deflecting/shaping/modifying element includes one of an opening or transparent window about a center axis of the beam deflecting/shaping/modifying element to facilitate switching from a forward viewing mode to at least one of a side-viewing mode and back-viewing mode.

6. The rotation-free beam-steering device according to claim 1, further comprising an axisymmetric light dispersing element disposed to interact with the probing optical beam exiting the at least one electrowetting cell,
wherein the axisymmetric light dispersing element is arranged to create a rotating spectrally split beam for spectrally encoded endoscopy (SEE).

7. The rotation-free beam-steering device according to claim 1, further comprising a rectangular light dispersing element disposed to interact with the probing optical beam exiting the at least one electrowetting cell,
wherein the at least one electrowetting cell consists of one electrowetting prism, and
wherein the rectangular light dispersing element is arranged so a beam deflection plane of the one electrowetting prism is orthogonal to a beam dispersion plane of the rectangular light dispersing element to obtain an image using spectrally encoded endoscopy (SEE).

8. The rotation-free beam-steering device according to claim 1, the at least one electrowetting cell consisting of a single electrowetting cell having a substantially cylindrical wall with a plurality of electrodes circumferentially positioned around the cylindrical wall.

9. The rotation-free beam-steering device according to claim 8,
wherein the plurality of electrodes are positioned along a longitudinal length of the cylindrical wall such that the plurality of electrodes are generally parallel to each and parallel to a center axis of the cylindrical wall, and
wherein the plurality of electrodes are generally equally spaced apart between each other along the longitudinal length of the cylindrical wall.

10. The rotation-free beam-steering device according to claim 1, wherein the at least one electrowetting cell consists of pair of electrowetting prisms stacked together adjacent each other such that the pair of electrowetting prisms are both disposed to interface with a probing beam and to deflect the probing beam in mutually orthogonal directions with respect to the pair of electrowetting prisms.

11. A rotation-free optical beam-steering device comprising:
a pair of electrowetting prisms stacked together contiguously adjacent each other such that the pair of electrowetting prisms are both disposed to interface with a probing beam and to deflect the probing beam in mutually orthogonal directions with respect to the pair of electrowetting prisms,
each electrowetting prism comprising:
at least one side wall defining an inner space, the at least one side wall having a wall lining adjacent to the inner space;
a liquid at least partially filling the inner space, the liquid having at least one controlled surface not in contact with the wall lining, the liquid having a contact angle with the wall lining, the at least one controlled surface being disposed to interface with a probing optical beam exiting the distal end of an optical fiber at an incidence angle; and
at least two electrodes separated from the inner space by the wall lining,
wherein manipulating electrical potential on the at least two electrodes controls a contact angle of liquid bounding the at least one controlled surface, whereby the probing optical beam direction rotates or moves about the pair of electrowetting prisms at a deflection angle θ.

12. The rotation-free optical beam-steering device according to claim 11, further comprising a beam focusing optical component positioned between a distal end of the optical fiber and a first one of the pair of electrowetting prisms.

13. The rotation-free optical beam-steering device according to claim 12, wherein the beam focusing optical component is integrated together with an input aperture of the first one of the pair of electrowetting prisms.

14. The rotation-free optical beam-steering device according to claim 11, further comprising an additional beam deflecting/shaping/modifying element disposed to interact with the probing optical beam exiting a second one of the pair of electrowetting prisms.

15. The rotation-free optical beam-steering device according to claim 14, wherein the beam deflecting/shaping/modifying element includes one of an opening or transparent window about a center axis of the beam deflecting/shaping/modifying element to facilitate switching from a forward viewing mode to at least one of a side-viewing mode and back-viewing mode.

16. The rotation-free optical beam-steering device according to claim 11, further comprising an axisymmetric light dispersing element disposed to interact with the probing optical beam exiting a second one of the pair of electrowetting prisms,
wherein the axisymmetric light dispersing element is arranged to create a rotating spectrally split beam for spectrally encoded endoscopy (SEE).

17. The rotation-free optical beam-steering device according to claim 1, wherein the at least one electrowetting cell is a cylindrical electrowetting prism.

18. An image acquisition system comprising:
at least one optical fiber having a proximal end and a distal end;
a light source and optical beam manipulation hardware, including at least one processor and at least one memory, adapted to manipulate probing or reflected optical beams adjacent and contiguous to the proximate end of the at least one optical fiber; and
a rotation-free optical beam-steering assembly comprising:
a pair of electrowetting prisms stacked together contiguously adjacent each other such that the pair of electrowetting prisms are both disposed to interface with a probing beam and to deflect the probing beam in mutually orthogonal directions with respect to the pair of electrowetting prisms, each electrowetting prism comprising:

at least one side wall defining an inner space, the at least one side wall having a wall lining adjacent to the inner space;

a liquid at least partially filling the inner space, the liquid having at least one controlled surface not in contact with the wall lining, the liquid having a contact angle with the wall lining, the at least one controlled surface being disposed to interface with a probing optical beam exiting the distal end of the optical fiber at an incidence angle; and at least two electrodes separated from the inner space by the wall lining, wherein manipulating electrical potential on the at least two electrodes controls a contact angle of liquid bounding the at least one controlled surface, whereby the probing optical beam direction rotates or moves about the pair of electrowetting prisms at a deflection angle $\theta$.

19. The image acquisition system according to claim 18, further comprising a spectrally encoded probe.

20. The image acquisition system according to claim 18, further comprising an optical coherence tomography probe.

* * * * *